(12) United States Patent
Kira et al.

(10) Patent No.: US 9,205,518 B2
(45) Date of Patent: Dec. 8, 2015

(54) WASHER ARRANGING APPARATUS, WASHER ARRANGING SYSTEM, AND WASHER ARRANGING METHOD

(75) Inventors: Kazuhiko Kira, Toyota (JP); Toshio Toyoda, Miyoshi (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 206 days.

(21) Appl. No.: 14/233,531

(22) PCT Filed: Jul. 11, 2012

(86) PCT No.: PCT/IB2012/001362
§ 371 (c)(1),
(2), (4) Date: Jan. 17, 2014

(87) PCT Pub. No.: WO2013/011364
PCT Pub. Date: Jan. 24, 2013

(65) Prior Publication Data
US 2014/0173890 A1    Jun. 26, 2014

(30) Foreign Application Priority Data
Jul. 20, 2011    (JP) .................. 2011-159433

(51) Int. Cl.
*B23P 19/00* (2006.01)
*B23P 19/04* (2006.01)
(Continued)

(52) U.S. Cl.
CPC .............. *B23P 19/04* (2013.01); *B23P 19/002* (2013.01); *B23P 19/004* (2013.01); *B23P 19/006* (2013.01);
(Continued)

(58) Field of Classification Search
CPC ...... B23P 19/001; B23P 19/002; B23P 19/04; B23P 19/004; B23P 19/08; B23P 19/007; B60B 29/00; B60B 29/006; B65G 47/1442; B65G 47/1428; B65G 47/24; B65G 47/1457; B65G 47/14; B65G 47/1407; B07C 2501/0009; Y10T 29/53313; Y10T 29/53383; Y10T 29/53539
USPC ............................................ 29/822, 787, 771
See application file for complete search history.

(56) References Cited

U.S. PATENT DOCUMENTS 1,486,818 A * 3/1924 Whitehead .................. 193/31 R
2,273,783 A * 2/1942 Irwin ..................... B23P 19/08
                                                      470/162
(Continued)

FOREIGN PATENT DOCUMENTS

JP     06-008072 A       1/1994
JP     06008072 A  *    1/1994
(Continued)

OTHER PUBLICATIONS

JP 06008072 English Machine Translation; Wakitani, Yasuyuki; Automatic Feeder for Nut; pp. 1-7.*
(Continued)

*Primary Examiner* — Jermie Cozart
*Assistant Examiner* — Bayan Salone
(74) *Attorney, Agent, or Firm* — Sughrue Mion, PLLC

(57) ABSTRACT

A washer arranging apparatus (10) includes a washer arranging portion (11) for positioning a plurality of washers (53) in predetermined arranging positions (α), and a washer supplying portion (12) for supplying the washers (53) to the washer arranging portion (11). The washer supplying portion (12) includes a holding portion (20) that has a horizontal floor portion (a bottom surface portion 21a of a base portion (21)) and is a portion for holding the washers (53) loaded into the washer supplying portion (12), and a vane member (23) that rotates above the bottom surface portion (21a) about an axis of the washer arranging portion (11) and pushes the washers (53) held in the holding portion (20) in a direction parallel to the bottom surface portion (21a). This washer arranging apparatus (10), a washer arranging system provided with this washer, arranging apparatus (10) and a washer setting tool (30) that is a tool for simultaneously setting a plurality of washers (53), and a washer arranging method using this washer arranging system are provided.

7 Claims, 20 Drawing Sheets

(51) Int. Cl.
  *B23P 19/08*   (2006.01)
  *B60B 29/00*   (2006.01)
  *B65G 47/14*   (2006.01)
  *B65G 47/24*   (2006.01)

(52) U.S. Cl.
  CPC .............. *B23P 19/007* (2013.01); *B23P 19/08* (2013.01); *B60B 29/00* (2013.01); *B60B 29/006* (2013.01); *B23P 19/001* (2013.01); *B65G 47/14* (2013.01); *B65G 47/1407* (2013.01); *B65G 47/1457* (2013.01); *B65G 47/24* (2013.01); *Y10T 29/53313* (2015.01); *Y10T 29/53383* (2015.01); *Y10T 29/53539* (2015.01)

(56) References Cited

U.S. PATENT DOCUMENTS

| | | | | |
|---|---|---|---|---|
| 4,604,024 A | * | 8/1986 | Edwards | B23P 19/006 294/64.3 |
| 4,699,261 A | * | 10/1987 | Nesin | B65G 47/256 198/391 |
| 6,116,406 A | * | 9/2000 | Marti Sala | B65G 47/1457 198/395 |
| 7,472,782 B2 | * | 1/2009 | Corbin | B65G 47/1457 198/392 |
| 7,857,162 B2 | * | 12/2010 | Minami | B65B 5/103 221/119 |

FOREIGN PATENT DOCUMENTS

| | | | |
|---|---|---|---|
| JP | 07-285037 A | | 10/1995 |
| JP | 07285037 A | * | 10/1995 |
| JP | 2004-001952 A | | 1/2004 |
| JP | 2004001952 A | * | 1/2004 |
| JP | 2006-205274 A | | 8/2006 |
| JP | 2006205274 A | * | 8/2006 |

OTHER PUBLICATIONS

JP 2004001952 English Machine Translation; Yoshioka, Noboru; Washer Separation and Alignment Mechanism; pp. 1-13.*
JP 20062050274 English Machine Translation; Matsumoto, Koji; Multi-Axis Temporary Fastening Tool; pp. 1-18.*
JP 07285037 English Translation; Kitazato, Shinichi; Supplying and Temporarily Fastening Device for Nut and Washer and its Method; pp. 1-12.*
International Search Report for corresponding International Patent Application No. PCT/IB2012/001362 mailed Aug. 29, 2012.

* cited by examiner

FIG. 20

(STEP-1)
- (STEP-1-1) LOAD WASHERS INTO WASHER ARRANGING APPARATUS
- (STEP-1-2) START WASHER ARRANGING APPARATUS
- (STEP-1-3) FINISH ARRANGING WASHERS IN ARRANGING POSITIONS
- (STEP-1-4) STOP WASHER ARRANGING APPARATUS (STEP-2)
- (STEP-2-1) ARRANGE WASHER SETTING TOOL ON WASHER ARRANGING APPARATUS
- (STEP-2-2) LOWER WASHER SETTING TOOL AND LOAD WASHERS (STEP-3)
- (STEP-3-1) ARRANGE WASHER SETTING TOOL ON ASSEMBLY
- (STEP-3-2) LOWER WASHER SETTING TOOL AND SUPPLY WASHERS
- (STEP-3-3) FINISH ARRANGING WASHERS

WASHER ARRANGING APPARATUS, WASHER ARRANGING SYSTEM, AND WASHER ARRANGING METHOD

BACKGROUND OF THE INVENTION

1. Field of the Invention

The invention relates to an arranging system for simultaneously arranging a plurality of washers on a plurality of stud bolts, an arranging apparatus that is an apparatus for arranging the washers used in the arranging system, and a washer arranging method using the arranging system.

2. Description of Related Art

There are cases in which a work that is an object of assembly is fixed to a portion to which the work is to be assembled, using a plurality of screwing members (such as nuts and bolts), as is the case when fastening a wheel of a tire to a hub using a plurality of nuts. For example, in the work of fixing a wheel to a hub using nuts, when tightening the nuts, a worker typically first screws the nuts by hand, one at a time, by only a few threads onto stud bolts that are implanted in the hub, and then performs the final tightening of the nuts at a predetermined torque using a tool such as a torque wrench. In the main description below, screwing together a screwing member such as a nut or a bolt to a screwable member such as a stud bolt or a nut by only a few threads before final tightening will be referred to as "temporary tightening".

However, if a worker temporarily tightens the nuts by hand one at a time, it takes time and is laborious, so a tool (a so-called multi-axis temporary tightening tool) capable of temporarily tightening a plurality of nuts simultaneously has been developed in order to perform temporary tightening work efficiently. For example, the technology described in Japanese Patent Application Publication No. 2006-205274 (JP 2006-205274 A) that will be described below is well known.

The multi-axis temporary tightening tool according to the related art described in JP 2006-205274 A includes a driving gear that rotates by driving means, a plurality of driven gears, a toothed belt that is wound around the driving gear and the plurality of driven gears and transmits the rotation of the driving gear to the plurality of driven gears, and a plurality of socket portions that are connected to the plurality of driven gears and engage with bolts or nuts. The driving gear is arranged in the center of a main body portion of the multi-axis temporary tightening tool, and the plurality of driven gears and socket portions are arranged around the driving gear in the main body portion. With this kind of structure, the plurality of socket portions are able to be simultaneously rotatably driven, thus making it possible to temporarily tighten the plurality of bolts or nuts or the like simultaneously, by inputting rotary force to the driving gear.

However, when temporarily tightening nuts using the multi-axis, temporary tightening tool according to the related art described in JP 2006-205274. A, the nuts must be arranged beforehand in each of the plurality of sockets. Conventionally, a worker manually arranges the nuts in the sockets, so the work of temporary tightening takes time and is laborious. Also, just as when arranging nuts by hand, when arranging washers on the stud bolts to which the nuts are screwed, a worker typically arranges the washers on the plurality of stud bolts by hand, and this work of arranging the washers also takes time and is laborious.

Also, conventionally, an apparatus for adjusting the postures of the washers or the like and supplying the washers or the like to a desired position has been developed. For example, the technology described in Japanese Patent Application Publication No. 6-8072 (JP 6-8072 A) that will be described below is well known. With the supplying apparatus (i.e., a thin plate-shaped work separating and removing apparatus) for washers or the like according to the related art described in JP 6-8072 A, an inclined bottom surface is provided in a hopper, and a separation chute that can be raised and lowered is provided adjacent to the lowest portion of the bottom surface. By raising and lowering the separation chute, an individual thin plate-shaped work is engaged and sequentially transferred from the hopper by its own weight through the separation chute and a fixed chute. This kind of supply apparatus for washers or the like is able to separate and remove thin plate-shaped works one by one with a simple structure. Moreover, the hopper is not vibrated nor is the thin plate-shaped work swept up by a scraper, so noise from vibration and the like is suppressed, which improves the work environment. In addition, the thin plate-shaped work is able to be prevented from being damaged.

However, it is difficult to use a supply apparatus for washers or the like according to related art, such as the supply apparatus described in JP 6-8072 A, for the purpose of arranging washers in positions corresponding to the stud bolts: Also, an apparatus capable of efficiently arranging washers in positions corresponding to stud bolts does not exist, so a worker must arrange the washers on the stud bolts by hand, and as a result, temporary tightening work takes time and is laborious.

SUMMARY OF THE INVENTION

In view of the foregoing problems, the invention provides a washer arranging apparatus and a washer arranging system used for efficiently arranging washers simultaneously on a plurality of stud bolts that are screwing members, as well as a washer arranging method using this washer arranging system.

Therefore, one aspect of the invention relates to a washer arranging apparatus that includes a washer arranging portion that has a substantially ring-shaped shape and is a portion for positioning a plurality of washers in predetermined arranging positions, and a washer supplying portion that is a portion for supplying the plurality of washers to the washer arranging portion and that is arranged inside the washer arranging portion. The washer supplying portion includes a holding portion that has a horizontal floor portion and is a portion for holding the plurality of washers loaded into the washer supplying portion, and a vane member that rotates above the floor portion about an axis of the washer arranging portion and pushes the washers held in the holding portion in a direction parallel to the floor portion.

With this kind of washer arranging apparatus, the rotating vane member pushes the washers on the floor portion horizontally and radially outward and discharges the washers from the holding portion, thus enabling the washers to be easily supplied to the washer arranging portion.

Also, in the washer arranging apparatus described above, the holding portion may be formed by i) a substantially truncated cone-shaped base portion that has a bottom surface portion that forms a bottom portion and is a substantially circular horizontal surface formed in a position higher than the washer arranging portion, and an inclined surface that forms an inclined portion that is inclined downward toward an outside in a radial direction with respect to a horizontal direction, on an outer peripheral edge portion of the bottom surface portion, and ii) a cylindrical portion that is a substantially cylindrical portion arranged with an axial center thereof aligned with a rotational axis of the vane member, and is integrally formed with the vane member. A washer discharge port that is an open portion for discharging the washers may be formed in an end portion of the cylindrical portion on a side of the cylindrical portion opposite the bottom surface portion.

With this kind of washer arranging apparatus, the washers loaded in the holding portion and held on the bottom surface portion are pushed in a horizontal direction by the rotating vane member and discharged from the washer discharge port, and the washers that have, been discharged from the washer discharge port slide down along the inclined portion. As a result, the washers are able to be supplied to the washer arranging portion.

Also, in the washer arranging apparatus described above, the washer arranging portion may include retaining portions that are recessed portions having a shape corresponding to the washers, into which the washers fit, that hold the washers horizontal, at predetermined positions for arranging the washers. Each of the retaining portions may include a support member that supports a lower surface of the washers, and a guide member that follows an outer peripheral surface of the washers. The guide member may be configured to be able to be displaced in a vertical direction and able to be displaced lower than the support member.

According to this kind of washer arranging apparatus, delivery of the washers to the washer setting tool is able to be made easier by the guide portion being displaced downward.

Also, in the washer arranging apparatus described above, the washer supplying portion may include a first pushing portion that is a portion that protrudes radially outward from the cylindrical portion and contacts the washer arranging portion, and pushes the washers supplied to the washer arranging portion in a rotational direction of the vane member on the washer arranging portion, and a second pushing portion that is a portion that pushes the washers supplied to the washer arranging portion downward in the retaining portions.

According to this kind of washer arranging apparatus, it is possible to reliably fit a washer that is not completely in a retaining portion into the retaining portion.

Also, in this kind of washer arranging apparatus, the vane member may be such that an extension line of a surface that abuts against the washers when viewed from the vertical direction is offset from a rotational center of the vane member, and a width of the vane member when viewed from the vertical direction becomes narrower from the rotational center of the vane member toward an outer end portion of the vane member.

According to this kind of washer arranging apparatus, the washers are able to be pushed radially outward by the rotating operation of the vane member.

Also, an upper surface of the vane member may be formed by an inclined surface that is inclined downward toward an outside in a radial direction.

According to this kind of washer arranging apparatus, it is possible to prevent washers from remaining on top of the vane member.

Another aspect of the invention relates to a washer arranging system that includes the washer arranging apparatus described above, and a washer setting tool that is a tool for simultaneously setting the plurality of washers, that has a plurality of socket portions arranged in positions corresponding to predetermined arranging positions set on the washer arranging portion, and in which retaining portions that are recessed portions shaped such that the washers will fit therein are formed in the socket portions.

According to this kind of washer arranging system, the washers are able to be simultaneously and reliably arranged on the plurality of stud bolts by the washer arranging system that has a simple structure.

Still another aspect of the invention relates to a washer arranging method using the washer arranging system described above. This washer arranging method includes a first arranging step of arranging the plurality of washers in the predetermined arranging positions on the washer arranging portion, with the washer arranging apparatus; a loading step of arranging the washer setting tool with respect to the washer arranging apparatus, that is in a state in which the plurality of washers are arranged in the predetermined arranging positions, such that the socket portions are arranged vertically above the arranging positions, displacing the washer setting tool vertically downward, and loading the washers that are arranged in the arranging positions on the washer arranging portion into retaining portions of the washer setting tool; and a second arranging step of arranging the socket portions of the washer setting tool that is in a state in which the washers are loaded into the retaining portions, vertically above a plurality of stud bolts onto which the washers are to be arranged, and displacing the washer setting tool vertically downward, and arranging the washers onto the stud bolts.

According to this kind of washer arranging method, the washers are able to be simultaneously and reliably arranged on the plurality of stud bolts by the washer arranging system that has a simple structure.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 20 is a flowchart illustrating a washer arranging method by the washer arranging system according to the example embodiment of the invention.

DETAILED DESCRIPTION OF EMBODIMENTS

Figure 1A:
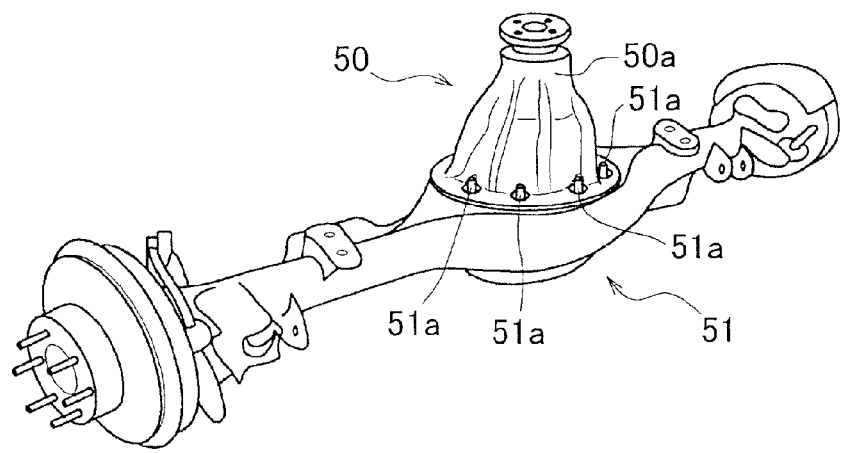
FIG. 1A is a perspective view showing a frame format of the overall structure of a work to which a washer arranging system according to one example embodiment of the invention is applied.
Figure 1B:
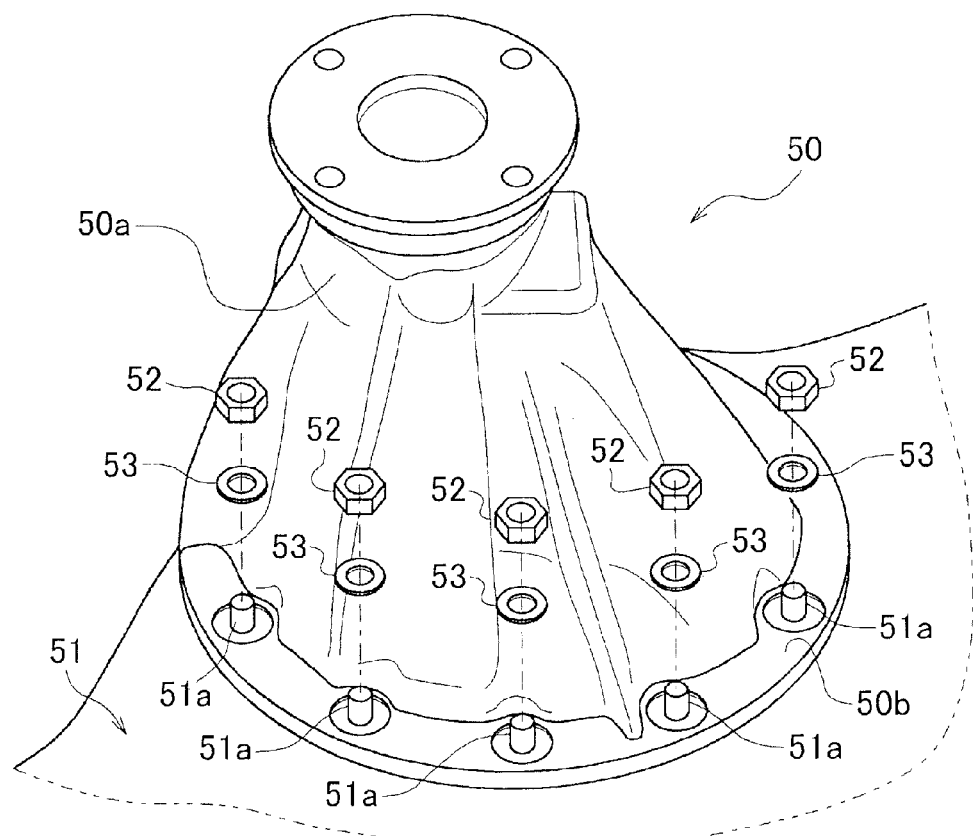
FIG. 1B is a partial perspective view showing a frame format of the arrangement of stud bolts that serve as screwable members of the work to which a washer arranging system according to the example embodiment is applied.

Next, example embodiments of the invention will be described. First, the overall structure of a washer arranging system according to one example embodiment of the invention will be described with reference to FIGS. 1A, 1B, and 2. The washer arranging system 1 according to the example embodiment of the invention is a group of apparatuses used when assembling a rear axle assembly 51, such as that shown in FIG. 1A, for example. More specifically, when assembling a differential carrier (hereinafter, referred to as "work 50") of the rear axle assembly 51, before a plurality of screwing members (a plurality of nuts 52 in this example embodiment) are fastened to a plurality of stud bolts 51a (see FIGS. 1A and 1B) that are screwable members provided on the rear axle assembly 51, a washer 53 must be arranged on each stud bolt 51a. The washer arranging system 1 is used to simultaneously and efficiently arrange the plurality of washers 53 onto the stud bolts 53 in this case.

Figure 2:
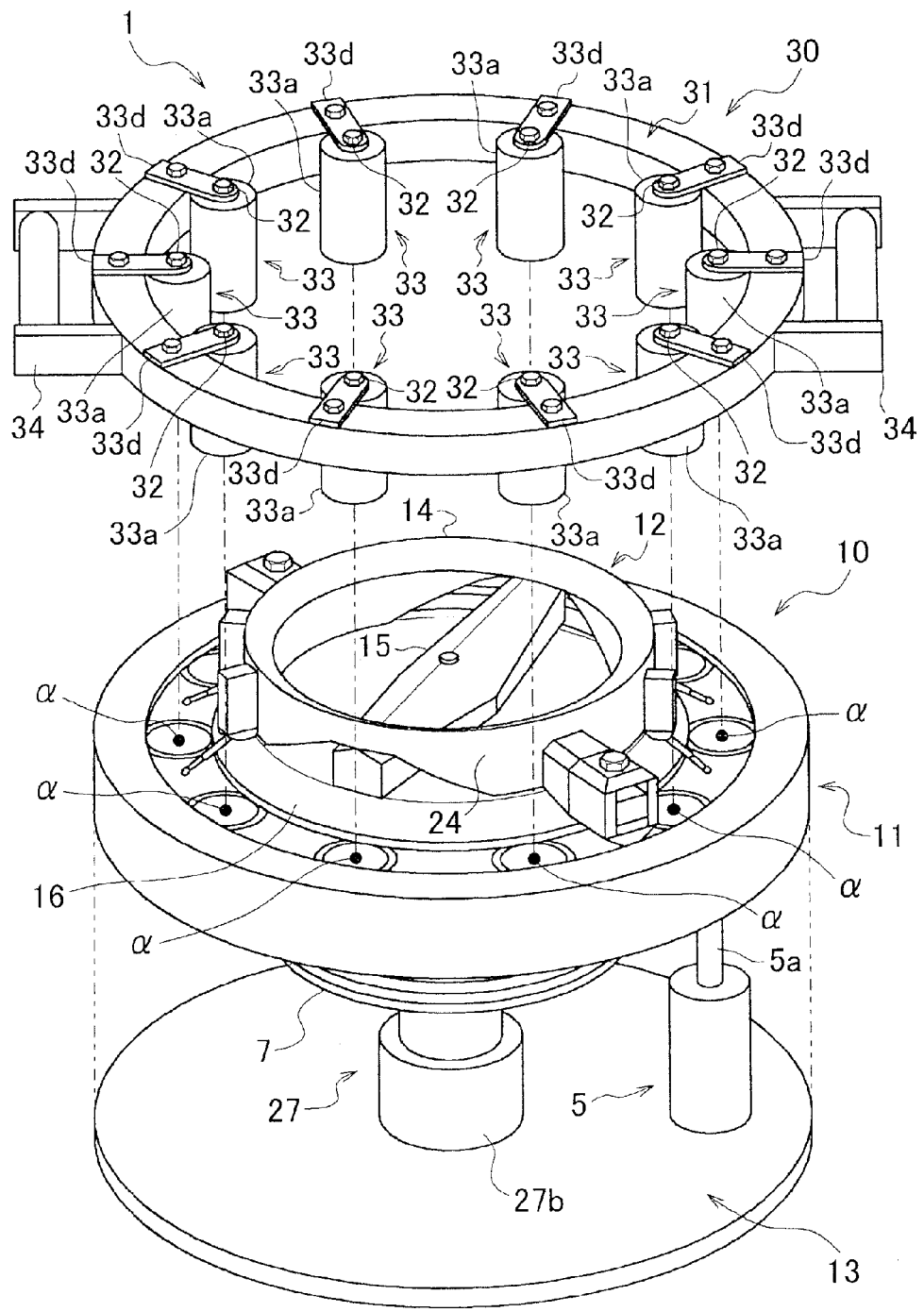
FIG. 2 is a perspective view showing a frame format of the overall structure of the washer arranging system according to the example embodiment of the invention.

As shown in FIG. 2, the washer arranging system 1 according to the example embodiment of the invention includes a washer arranging apparatus 10 and a washer setting tool 30. The washer arranging apparatus 10 is an apparatus capable of efficiently loading a plurality of washers 53 into the washer setting tool 30. The washer setting tool 30 is a device capable of efficiently supplying the plurality of washers 53 to the stud bolts 51a of the rear axle assembly 51.

The washer setting tool 30 includes a plurality of socket portions 33 corresponding to the arrangement of the stud bolts 51a of the rear axle assembly 51. A plurality of arranging positions a corresponding to the arrangement of the socket portions 33 of the washer setting tool 30 (and thus the arrangement of the stud bolts 51a) are set in the washer arranging apparatus 10.

Figure 3:
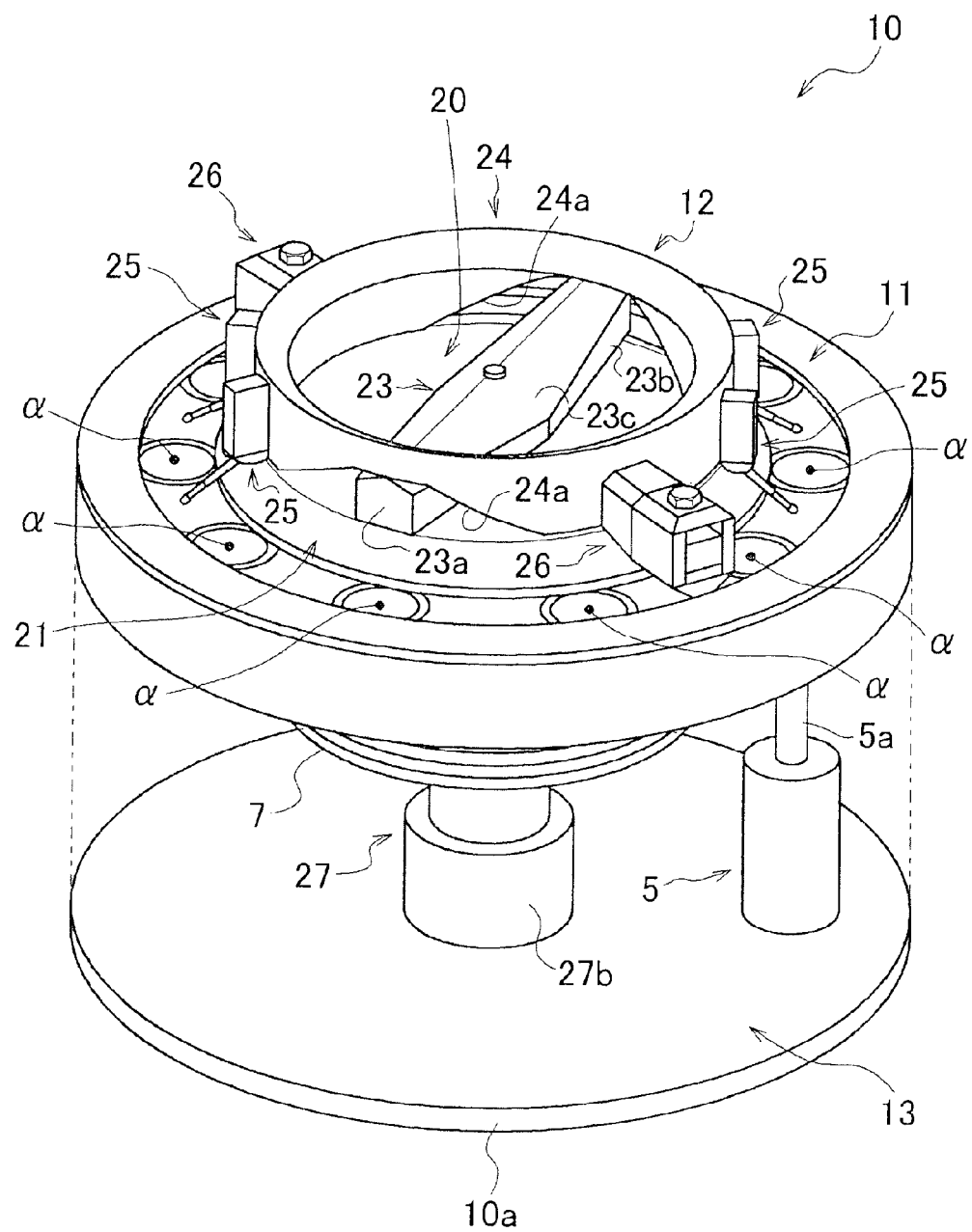
FIG. 3 is a perspective view showing a frame format of a washer arranging apparatus according to the example embodiment of the invention.
Figure 4:
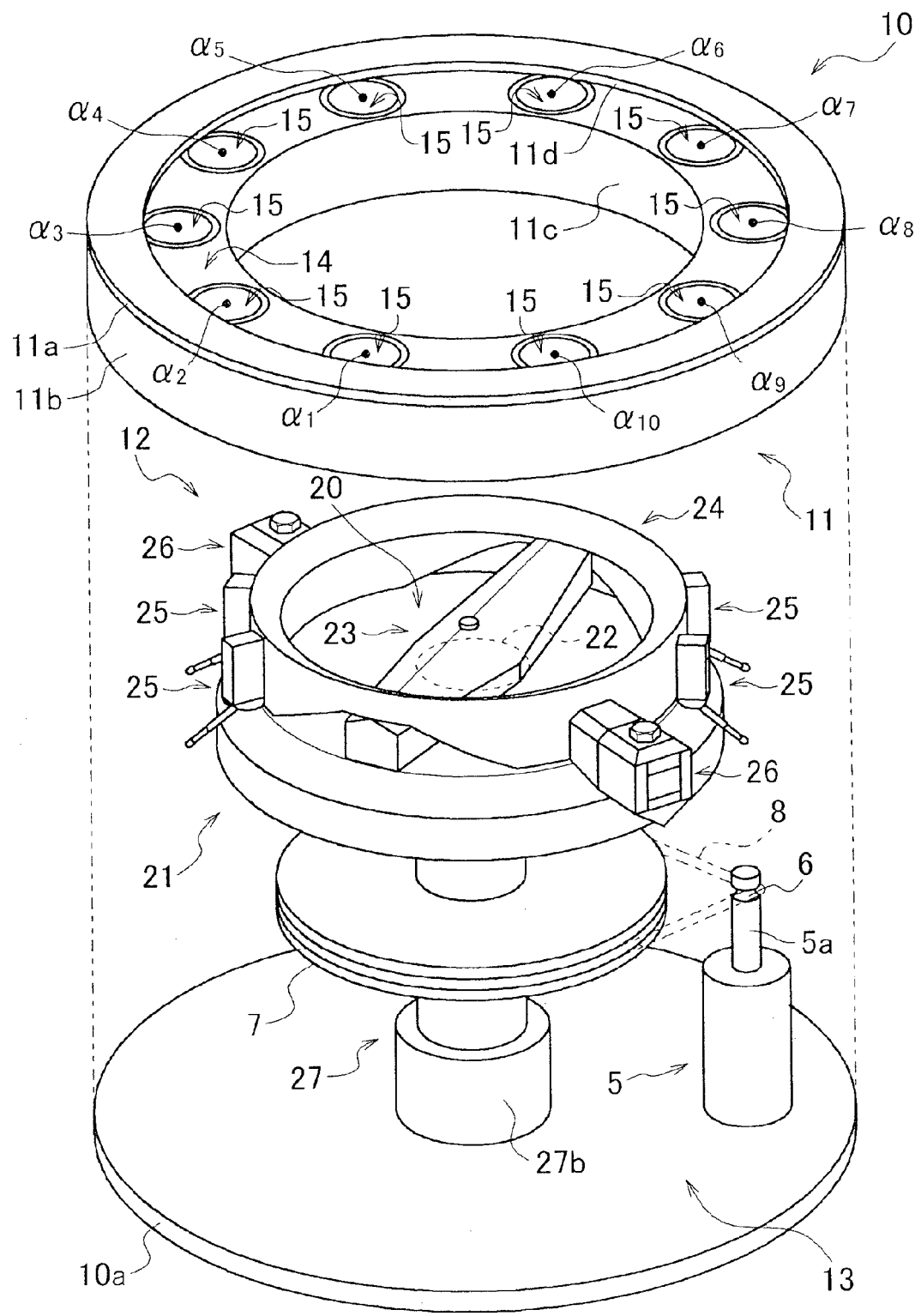
FIG. 4 is an exploded perspective view showing a frame format of the washer arranging apparatus according to the example embodiment of the invention.

Here, the overall structure of the washer arranging apparatus according to the example embodiment of the invention will be described with reference to FIGS. 3 to 14. As shown in FIG. 3, the washer arranging apparatus 10 is an apparatus capable of arranging the washers 53 one by one in the arranging positions a corresponding to the arrangement of the plurality of socket portions 33 of the washer setting tool 30. The washer arranging apparatus 10 includes a washer arranging portion 11, a washer supplying portion 12, and a driving portion 13, and the like. In this example embodiment, stud bolts 51a are provided in 10 locations on the rear axle assembly 51, so 10 washers 53 need to be supplied. As shown in FIG. 4, 10 arranging positions α1 to α10 are set as the arranging positions a in the washer arranging portion 11.

Figure 5A:
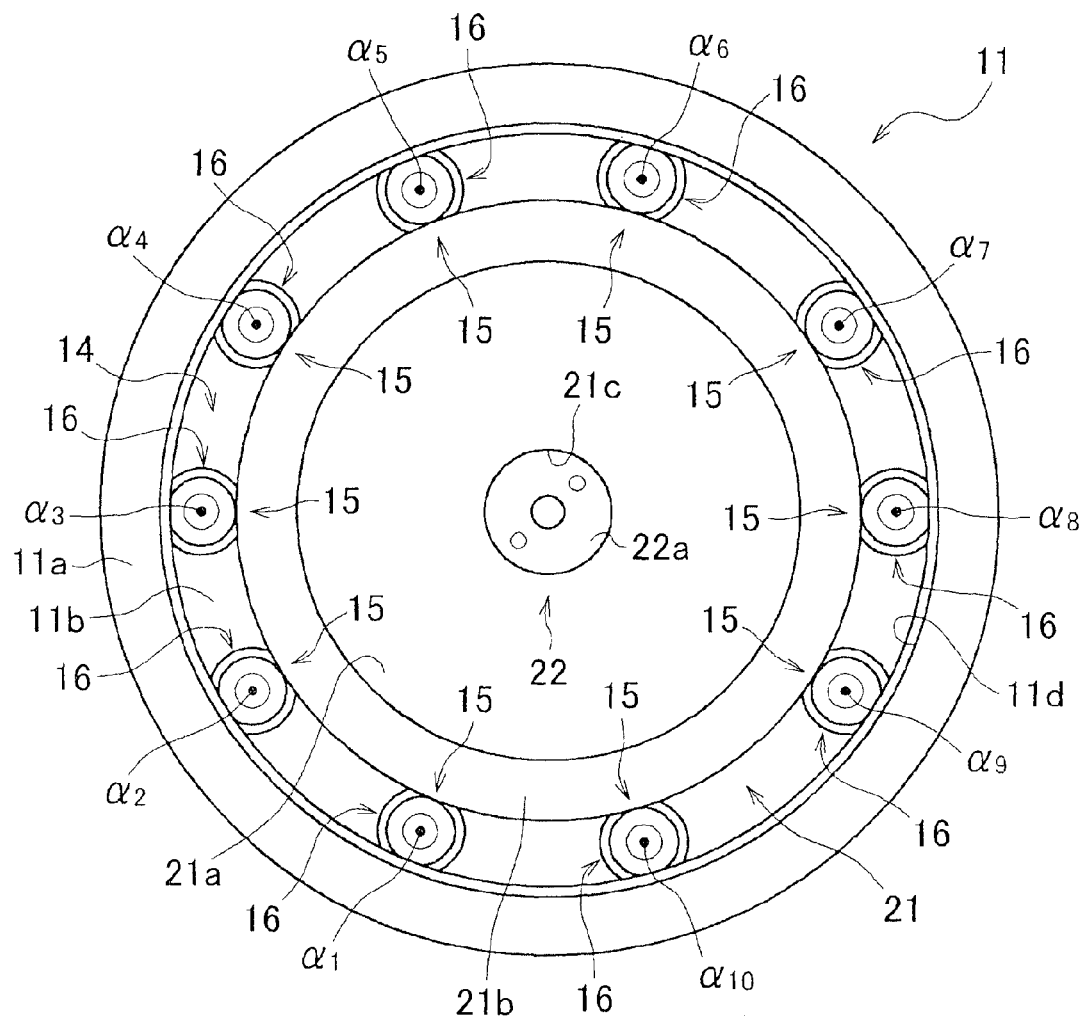
FIG. 5A is a plan view showing a frame format of a washer arranging portion and a base portion that form part of the washer arranging apparatus.
Figure 5B:
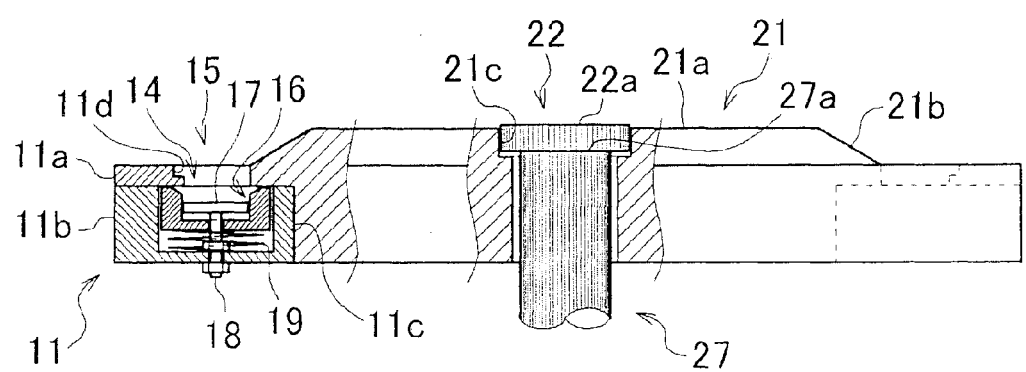
FIG. 5B is a side sectional view showing a frame format of the washer arranging portion and the base portion that form part of the washer arranging apparatus.

First, the washer arranging portion 11 will be described. The washer arranging portion 11 is a portion for arranging a plurality of washers 53 supplied from the washer supplying portion 12 to the predetermined arranging positions α1 to α10 that correspond to the arrangement of the plurality of socket portions 33 of the washer setting tool 30. The washer arranging portion 11 is formed by a pair of upper and lower ring-shaped members, i.e., an upper ring 11a and a lower ring 11b, as shown in FIGS. 4, 5A, and 5B. The washer arranging portion 11 is fixedly supported via a supporting member and the like, not shown, to a bottom portion 10a of the washer arranging apparatus 10.

As shown in FIG. 4, the washer supplying portion 12 is inserted through a hole 11c formed on an inner peripheral side of the washer arranging portion 11. The plurality of washers 53 are supplied from inside the washer arranging portion 11 toward the radial outside by the washer supplying portion 12.

Also, as shown in FIGS. 4, 5A, and 5B, the outside diameter dimension of the upper ring 11a is the same as the outside diameter dimension of the lower ring 11b, and the inside diameter dimension of the upper ring 11a is larger than the inside diameter dimension of the lower ring 11b. As a result, a conveyance path 14 that is a ring-shaped recessed portion is formed surrounded by the lower ring 11b, an inner peripheral surface 11d of the upper ring 11a, and the washer supplying portion 12.

Figure 6A:
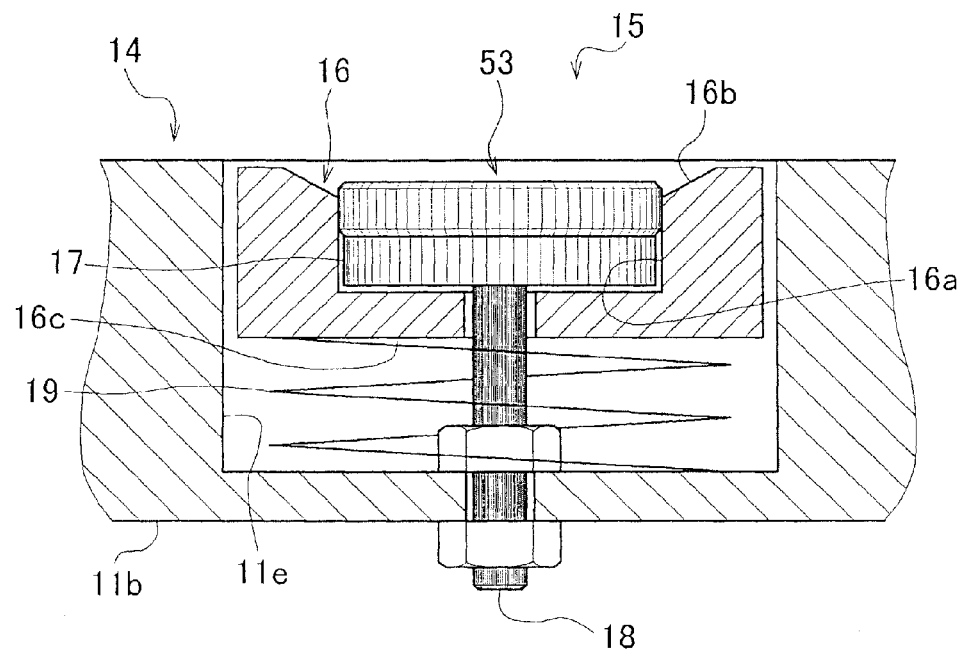
FIG. 6A is both an enlarged sectional view showing a frame format of a retaining portion of the washer arranging portion, and a view showing a frame format of a washer in a retained state.
Figure 6B:
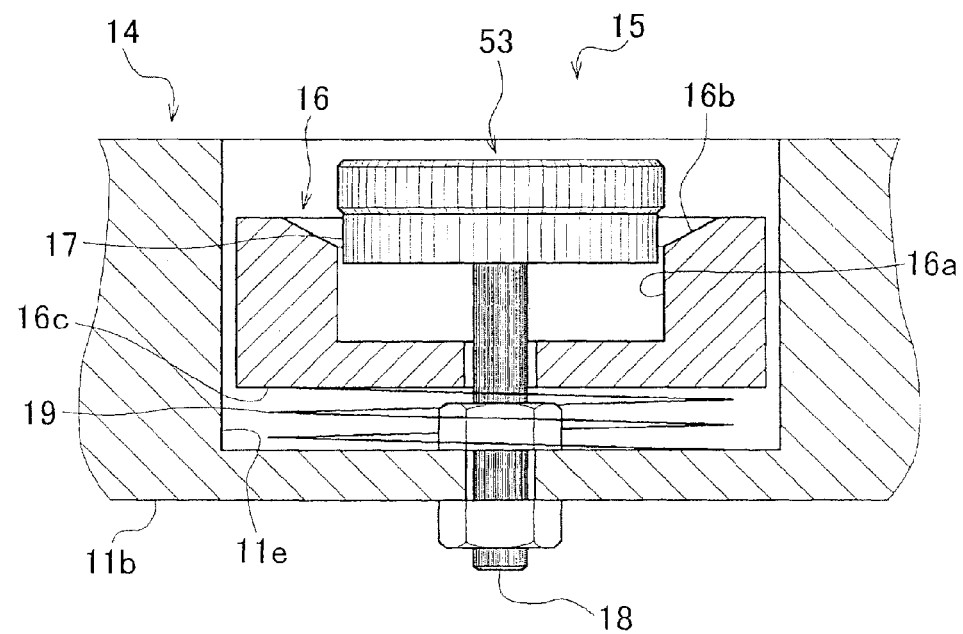
FIG. 6B is both an enlarged sectional view showing a frame format of the retaining portion of the washer arranging portion, and a view showing a frame format of a washer in a non-retained state.

Also, the washer arranging portion 11 includes a plurality of retaining portions 15 that form recessed portions for retaining the washers 53, in a bottom portion of the conveyance path 14. As shown in FIGS. 6A and 6B, each retaining portion 15 is housed within a recessed portion 11e formed in the lower ring 11b, and is formed by a guide member 16, a support member 17, a support shaft 18, and a spring 19, and the like.

As shown in FIGS. 5A, 5B, 6A, and 6B, the outside diameter dimension of the guide member 16 is substantially the same as the inside diameter dimension of the recessed portion 11e. Also, a guide hole 16a having an inside diameter dimension substantially the same as the outside diameter dimension of the washers 53 is formed in the guide member 16. Also, a, substantially bowl-shaped inclined surface 16b that slopes down toward the center is formed on an upper end surface of the guide member 16 to make it easier for the washers 53 to slide into the guide hole 16a.

The support member 17 that is a portion for supporting a lower surface of a washer 53 fit into the guide hole 16a is arranged in the guide hole 16a. Also, the support member 17 is further fixedly supported by the support shaft 18 that is fixed by the lower ring 11b and passes through the guide member 16.

Also, the spring 19 is interposed between the recessed portion 11e and a lower surface 16c of the guide member 16, thus enabling the guide member 16 to be elastically displaced in the axial direction of the recessed portion 11e. With this kind of structure, when the washer 53 is fit into the guide hole 16a of the retaining portion 15, the washer 53 is restrained and positioned by the guide member 16 and the support member 17, but when the guide member 16 is displaced downward from this state, the washer 53 is no longer restrained by the guide member 16.

That is, in the washer arranging apparatus 10 according to the example embodiment of the invention, the washer arranging portion 11 includes the retaining portions 15 that are recessed portions having shapes corresponding to the washers 53, into which the washers 53 are fit, that hold the washers 53 horizontal, in the predetermined arranging positions α1 to α10 for arranging the washers 53. Also, each of the retaining portions 15 includes the support member 17 that is a supporting portion that supports the lower surface of the washer 53, and the guide member 16 that is a guiding portion that follows the outer peripheral surface of the washer 53. Moreover, the guide member 16 is able to be displaced in the vertical direction, and is able to be displaced lower than the support member 17. With this kind of structure, delivery of the washers 53 to the washer setting tool 30 is able to be made easier by the guide member 16 being displaced downward.

Next, the washer supplying portion 12 will be described. The washer supplying portion 12 is a portion that a worker loads the washers 53 into that supplies the washers 53, delivering them to the entire washer arranging portion 11. The washer supplying portion 12 includes a base portion 21, a rotating table 22, a rotary vane 23, a cylindrical portion 24, dispersing portions 25, and pushing portions 26, and the like, as shown in FIG. 4.

Figure 7A:
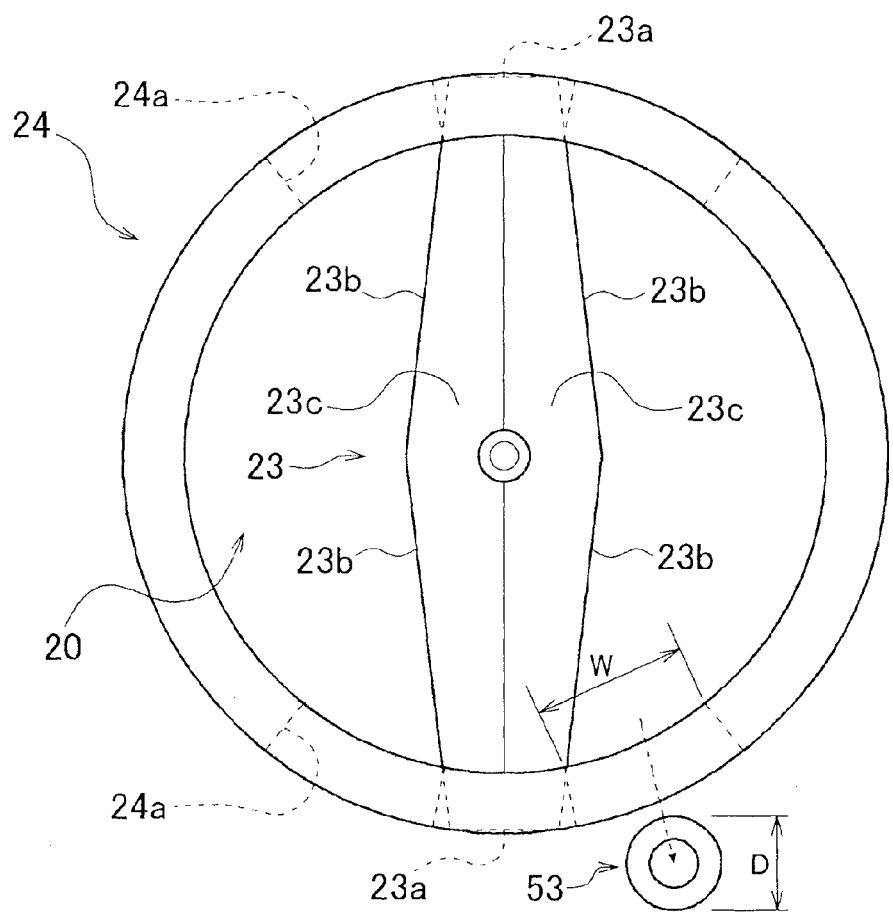
FIG. 7A is a plan view showing a frame format of a rotary vane and a cylindrical portion that form part of the washer arranging apparatus.
Figure 7B:
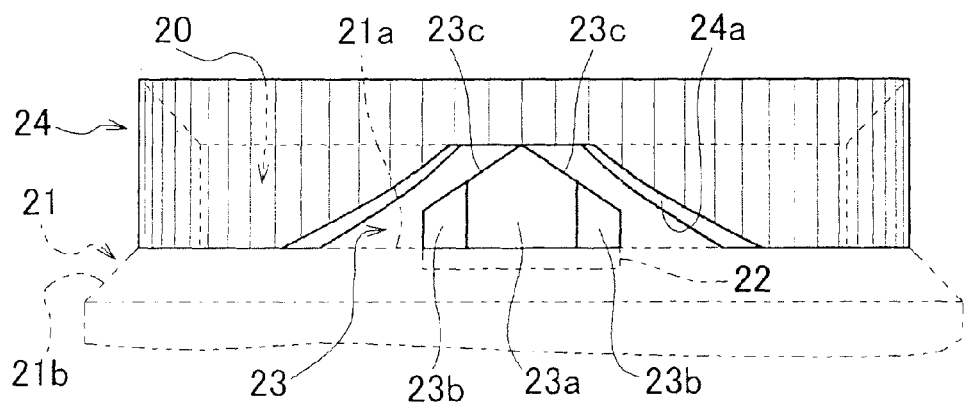
FIG. 7B is a side view showing a frame format of the rotary vane and the cylindrical portion that form part of the washer arranging apparatus.

As shown in FIGS. 5A, 5B, and 7B, the base portion 21 is a substantially disc-shaped portion that, together with the cylindrical portion 24, forms a holding portion 20 that is a space for temporarily holding the plurality of washers 53. The base portion 21 is integrally fixed to the washer arranging portion 11. A bottom surface portion 21a that forms a bottom portion of the holding portion 20 is formed on an upper surface of the base portion 21. An inclined surface 21b that is a surface that is inclined downward toward the outside in the radial direction is formed on an outer peripheral edge portion of the bottom surface portion 21a.

Furthermore, as shown in FIGS. 5A and 5B, a circular hole 21c is formed in an axial position of the disc-shaped base portion 21. The rotating table 22 that is a disc-shaped portion that is able to rotate relative to the base portion 21 is arranged in the circular hole 21c. Here, an upper surface portion 22a of the rotating table 22 is slightly higher than the bottom surface portion 21a of the base portion 21, and forms a step with a vertical interval of less than the thickness of the washer 53.

The rotating table 22 is a portion for supporting the rotary vane 23 and the cylindrical portion 24, and is fixed to an upper end portion 27a of a rotating shaft 27, as shown in FIG. 5B. The rotating shaft 27 is rotatably supported by a support portion 27b that is fixed to the bottom portion 10a of the washer arranging apparatus 10, and is rotated by rotary force being input to a driven pulley 7 that is fixed to the rotating shaft 27, as shown in FIG. 4. Therefore, the rotating table 22 rotates about the axis of the rotating shaft 27 as the rotating shaft 27 rotates.

As shown in FIGS. 4 and 7A and 7B, the rotary vane 23 is a member for pushing (i.e., sweeping up) the washers 53 that have been dispersed on the bottom surface portion 21a of the base portion 21, in the horizontal direction. The rotary vane 23 is fixed to the rotating table 22 and is able to rotate relative to the bottom surface portion 21a.

The rotary vane 23 is substantially rhombic-shaped when viewed from above, and the center position of the rotary vane 23 is aligned with the axis of the rotating table 22. Also, end surfaces 23a are formed on both end portions in the length direction of the rotary vane 23, and pushing surfaces 23b that are surfaces for pushing the washers 53 are formed on the side portions in the width direction of the rotary vane 23.

Furthermore, an upper surface of the rotary vane 23 is formed by two inclined surfaces 23c with the position of a center line drawn in the length direction as the boundary between the two. The shape of the rotary vane 23 is symmetrical about the position of the center line when viewed from above, and is mountain-shaped with the position of the center line as the apex when viewed from the side.

The step is provided between the rotating table 22 and the bottom surface portion 21a, so the rotary vane 23 that is fixed on the rotating table 22 rotates above the bottom surface portion 21a (in a position separated from the bottom surface portion 21a by a predetermined distance) without contacting (touching) the bottom surface portion 21a and with a predetermined interval of the step portion maintained.

Further, the cylindrical portion 24 that is a substantially cylindrical member that has an outer diameter dimension that is substantially the same as the length of the rotary vane 23 is integrally fixed to the rotary vane 23 in a manner encircling the rotary vane 23, near the end surfaces 23a that are the end portions on both sides in the length direction of the rotary vane 23. The cylindrical portion 24 rotates above the bottom surface portion 21a (in a position separated from the bottom surface portion 21a by a predetermined distance) with a predetermined interval of the step portion maintained, just like the rotary vane 23.

Also, with the washer supplying portion 12, the holding portion 20 that is a portion for temporarily holding the washers 53 is formed by a substantially cylindrical space that is formed by the bottom surface portion 21a and a void portion formed inside of the cylindrical portion 24, as shown in FIGS. 3 and 4.

Also, as shown in FIGS. 7A and 7B, washer discharge ports 24a that are cutout portions are formed in two locations in the cylindrical portion 24, around the portion of the cylindrical portion 24 to which the end surfaces 23a are fixed. The washer discharge ports 24a are open portions for discharging the washers 53, that are formed in the end portion of the cylindrical portion 24 that is on the side opposite (i.e., facing) the bottom surface portion 21a. The washer discharge ports 24a are point-symmetrical about the axial position of the cylindrical portion 24 when viewed from the axial direction of the cylindrical portion 24. In this example embodiment, the washer discharge ports 24a are provided two locations in the washer supplying portion 12, but the number of washer discharge ports 24a may be selected as appropriate.

Moreover, when describing the rotary vane 23 in greater detail, a minimum dimension W of a gap formed between the pushing surfaces 23b and the washer discharge ports 24a is at least the dimension of a diameter D of the washers 53 (i.e., W>D), as shown in FIG. 7A.

Figure 8A:
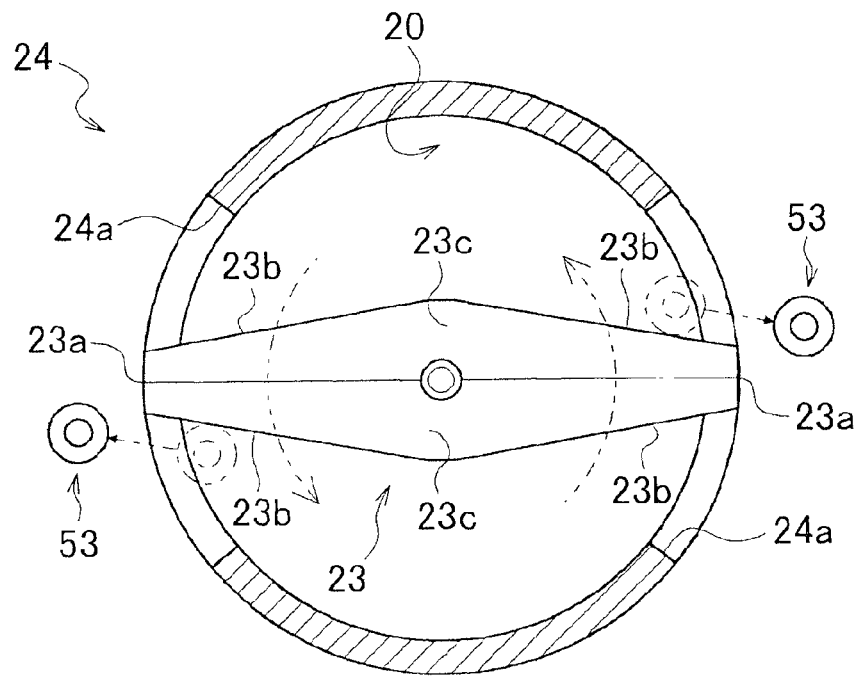
FIG. 8A is a plan view showing a frame format of washers being discharged from a holding portion provided in the washer arranging apparatus.

Also, with the washer supplying portion 12, the washers 53 that are held in the holding portion 20 are pushed by the rotary vane 23 and consequently carried radially outward on the bottom surface portion 21a and discharged from the holding portion 20 through the washer discharge ports 24a, as shown in FIG. 8A.

Figure 9:
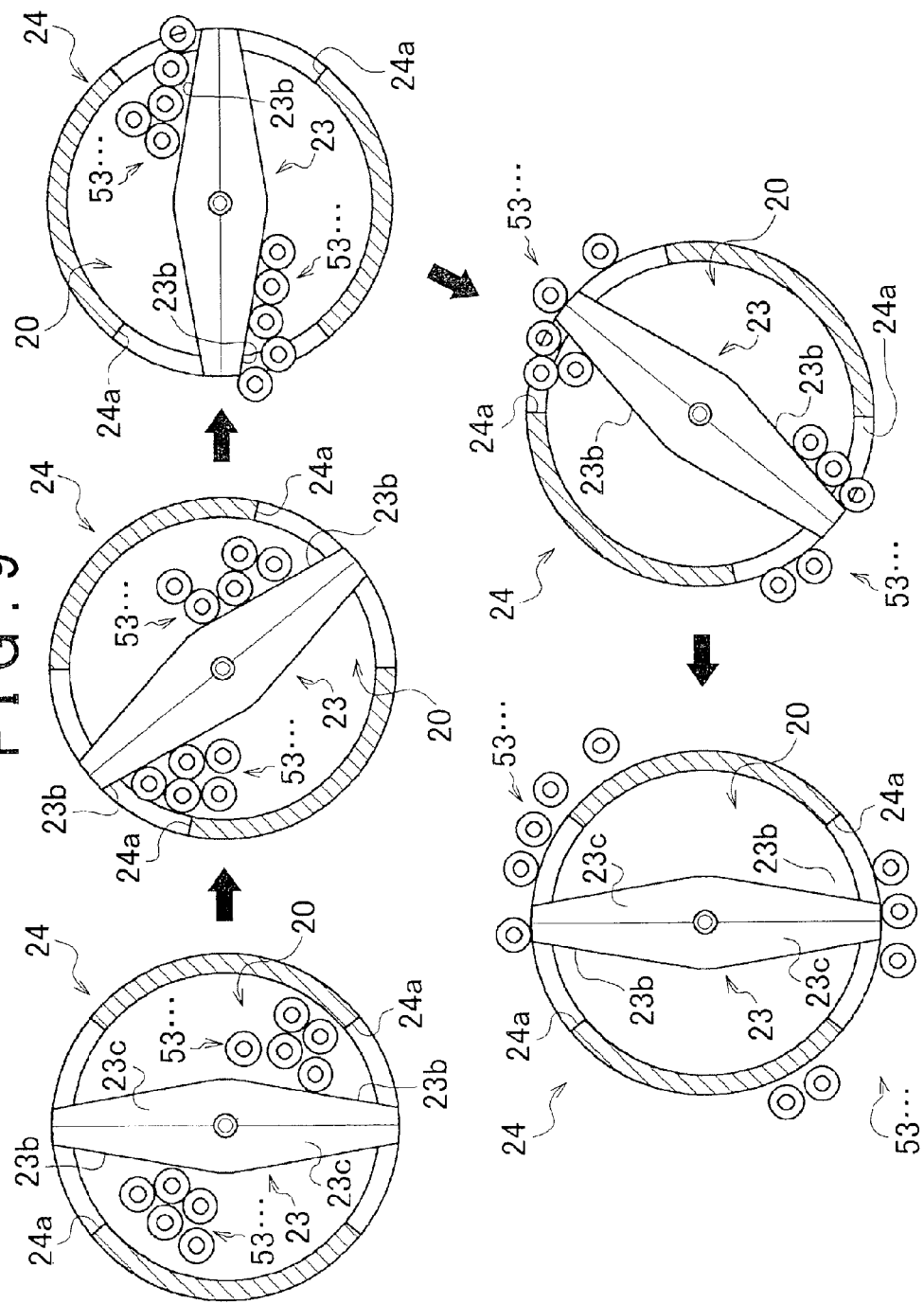
FIG. 9 is a view showing a frame format of the washers being pushed by the rotary vane.

Also, with the washer supplying portion 12, even if a plurality of the washers 53 are held in the holding portion 20, the washers 53 will be pushed by the rotary vane 23 and consequently carried radially outward on the bottom surface portion 21a while running along the rotary vane 23, and the washers 53 will be discharged from the holding portion 20 one by one, as shown in FIG. 9.

In this example embodiment, the rotational direction of the rotary vane 23 may be selected to be either clockwise or counterclockwise, so the pushing surfaces 23b are formed on both end surfaces in the width direction of the rotary vane 23. However, it is sufficient to have the pushing surface 23b formed on at least the surface on the leading (i.e., front) side with respect to the rotational direction of the rotary vane 23. That is, when the rotational direction of the rotary vane 23 is fixed, the pushing surface 23b does not have to be formed on the trailing (i.e., back) surface with respect to the rotational direction of the rotary vane 23, from among the end surfaces in the width direction of the rotary vane 23.

Here, stress applied to the washers 53 from the pushing surfaces 23b following rotation of the rotary vane 23 will be described with reference to FIGS. 10A to 10C. The pushing surfaces 23b of the rotary vane 23 are inclined at a predetermined angle from the radial direction around the rotating shaft 27. With the rotary vane 23, the end point on the end surface 23a side of the pushing surfaces 23b is defined as end point A, and the end point on the rotating shaft 27 side of the pushing surfaces 23b is defined as end point B, as shown in FIG. 10B. In this case; the end point B is not aligned with the axial center O of the rotating shaft 27. Also, an angle formed between a line segment AB and a line segment AO (in the radial direction) is defined as a predetermined angle θ1. In this case, the pushing surface 23b rotates around the rotating shaft 27 while always being kept at the predetermined angle θ1 with respect to the line segment AO (in the radial direction).

Figure 10A:
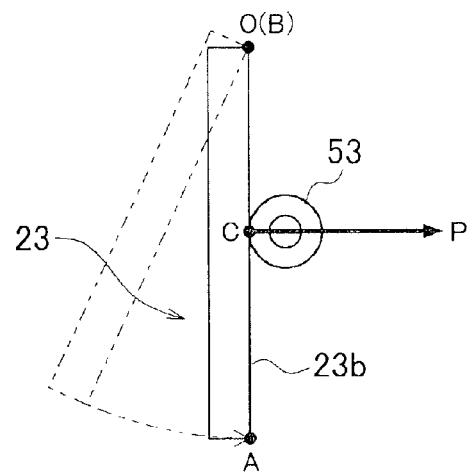
FIG. 10A is a view illustrating a washer pushing operation by the rotary vane, and shows a case in which an extension line of a pushing surface passes through the center of rotation.
Figure 10B:
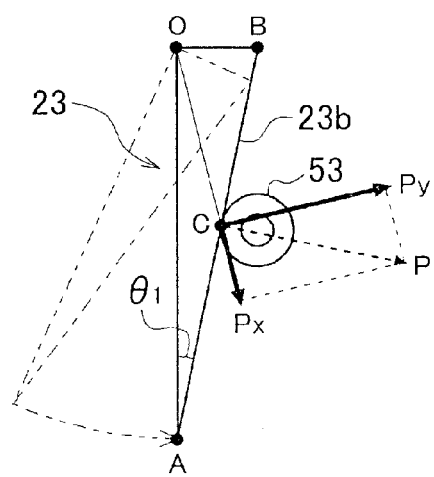
FIG. 10B is a view of a washer pushing operation by the rotary vane, and shows a case in which the extension line of the pushing surface does not pass through the center of rotation, and an angle formed between a line segment OA and a line segment BA is θ1.

As shown in FIG. 10A, if the angle of the pushing surface 23b was set such that the line segment AB passed through the rotational center O of the rotary vane 23, pressure P would be applied in the tangential direction of rotation by the pushing surface 23b to the washer 53 at contact point C of the pushing surface 23b and the washer 53. At this time, the pressure P would act, in a direction orthogonal to the pushing surface 23b, so component force toward the radial outside would not be generated, and the washer 53 would be displaced in the tangential direction of rotation. That is, the washer 53 would stop inside the holding portion 20 and not be discharged from the holding portion 20. In this description, centrifugal force that acts on the washer 53 is not taken into account (this is also true below).

As shown in FIG. 10B, when the angle θ1 of the pushing surface 23b is set with the line segment AB not passing through the rotational center O of the rotary vane 23, the pressure P is applied in the direction orthogonal to the pushing surface 23b to the washer 53 at the contact point C of the pushing surface 23b and the washer 53. At this time, the pressure P is, divided into a component force Px in the radial direction of rotation of the rotary vane 23 and a component force Py in the tangential direction of rotation orthogonal to the component force Px, so the washer 53 is displaced toward the radial outside according to the component force Px. That is, when the angle θ1 of the pushing surface 23b is set, the washer 53 is displaced toward the radial outside (i.e., in the direction in which it is discharged from the holding portion 20) on the bottom surface portion 21a.

Figure 8B:
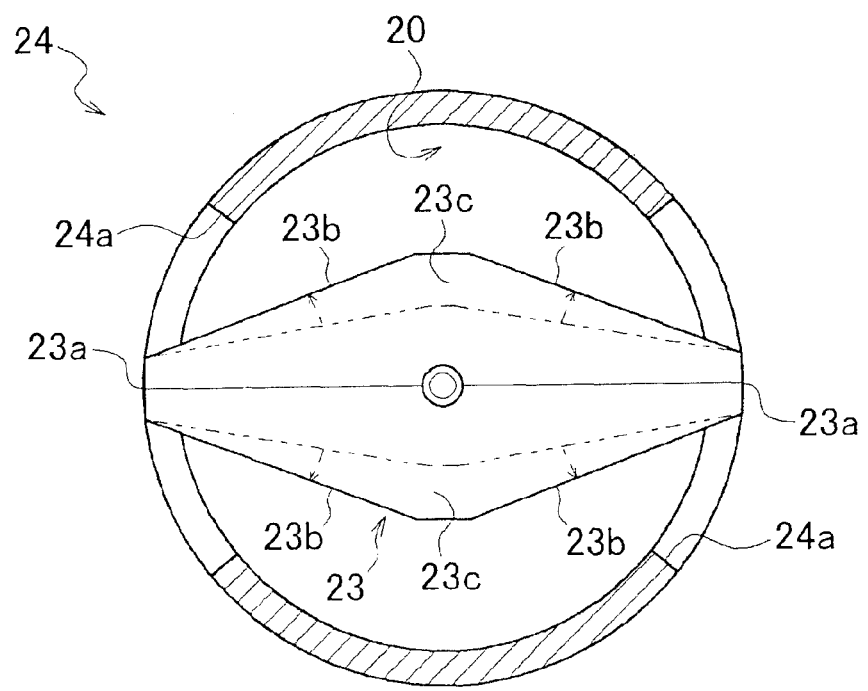
FIG. 8B is a plan view showing a frame format of a method for adjusting the rate at which the washers are discharged from the holding portion provided in the washer arranging apparatus.
Figure 10C:
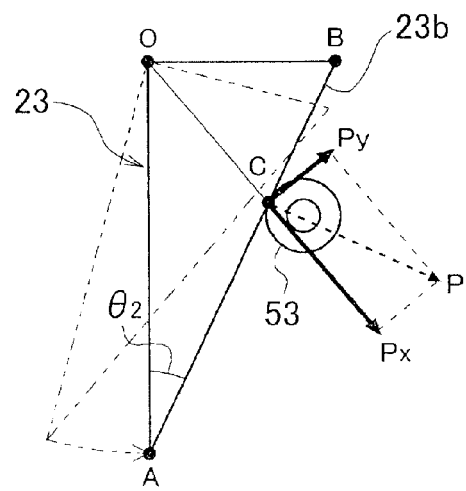
FIG. 10C is a view of a washer pushing operation by the rotary vane, and shows a case in which the extension line of the pushing surface does not pass through the center of rotation, and the angle formed between the line segment OA and the line segment BA is θ2 (θ2>θ1)

Furthermore, FIG. 10C shows a case in which the line segment AB does not pass through the rotational center O of the rotary vane 23, and the angle of the pushing surface 23b is set to an even larger angle θ2. In this case, the pressure P is applied in a direction orthogonal to the pushing surface 23b to the washer 53 at the contact point C of the pushing surface 23b and the washer 53. At this time, the component force Px in the radial direction of rotation of the rotary vane 23 increases and the component force Py in the tangential direction of rotation decreases. That is, with the washer supplying portion 12, the pressure P for discharging the washer 53 is able to be adjusted by changing the angle of the pushing surface 23b, as shown in FIG. 8B, which enables the discharge rate of the washer 53 to be adjusted.

That is, in the washer arranging apparatus 10 according to the example embodiment of the invention, the extension line of the pushing surface 23b that is a surface that abuts against the washer 53 when viewed from the vertical direction is offset from the rotational center of the rotary vane 23, and the width of the rotary vane 23 when viewed from the vertical direction becomes narrower from the rotational center of the rotary vane 23 toward the outer end portion of the rotary vane 23. This kind of structure enables the washer 53 to be pushed radially outward by the rotating operation of the rotary vane 23.

Also, in the washer arranging apparatus 10 according to the example embodiment of the invention, the rotary vane 23 is formed by the inclined surfaces 23c in which the upper surfaces are inclined downward toward the outside in the radial direction. This kind of structure makes it possible to prevent washers 53 that have been loaded into the holding portion 20 from remaining on top of the rotary vane 23.

Figure 11A:
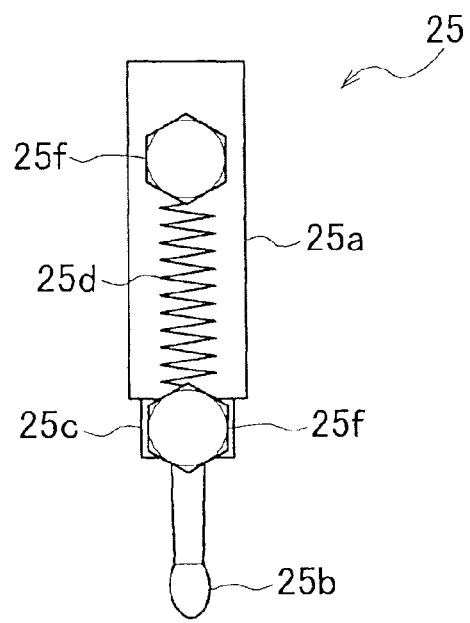
FIG. 11A is a front view showing a frame format of a dispersing portion provided in the washer arranging apparatus.
Figure 11B:
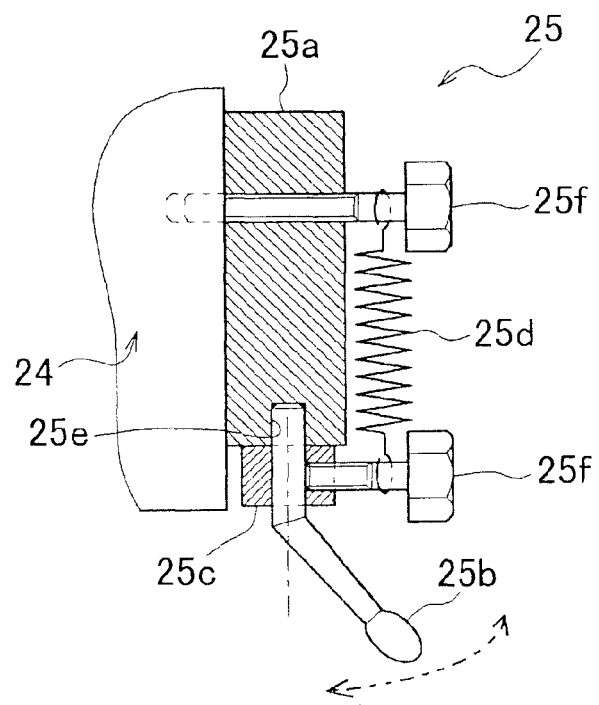
FIG. 11B is a side sectional view showing a frame format of the dispersing portion provided in the washer arranging apparatus.

Also, as shown in FIGS. 3 and 4, the dispersing portions 25 and the pushing portions 26 are fixed to the outer peripheral surface of the cylindrical portion 24. As shown in FIGS. 11A and 11B, the dispersing portions 25 are portions that protrude downward at an angle from the outer peripheral surface of the cylindrical portion 24, in order to sweep the washer arranging portion 11 so as to disperse the washers 53 on the washer arranging portion 11 and deliver them to the retaining portions 15 formed in the washer arranging portion 11. Each of the dispersing portions 25 includes a base portion 25a, an abutting portion 25b, a collar 25c, and a spring 25d and the like.

The abutting portion 25b is supported in a hole 25e formed in the base portion 25a, in a state able to rotate about the axis of the hole 25e. The collar 25c is fixed to the abutting portion 25b. Also, the spring 25d is connected via bolts 25f between the base portion 25a and the collar 25c. When the abutting portion 25b rotates about the axis, the spring 25d expands. The spring 25d exerts spring force on the abutting portion 25b in a direction that returns the abutting portion 25b to its original rotational position (i.e., the position where the spring 25d is at its regular length).

Figure 12:
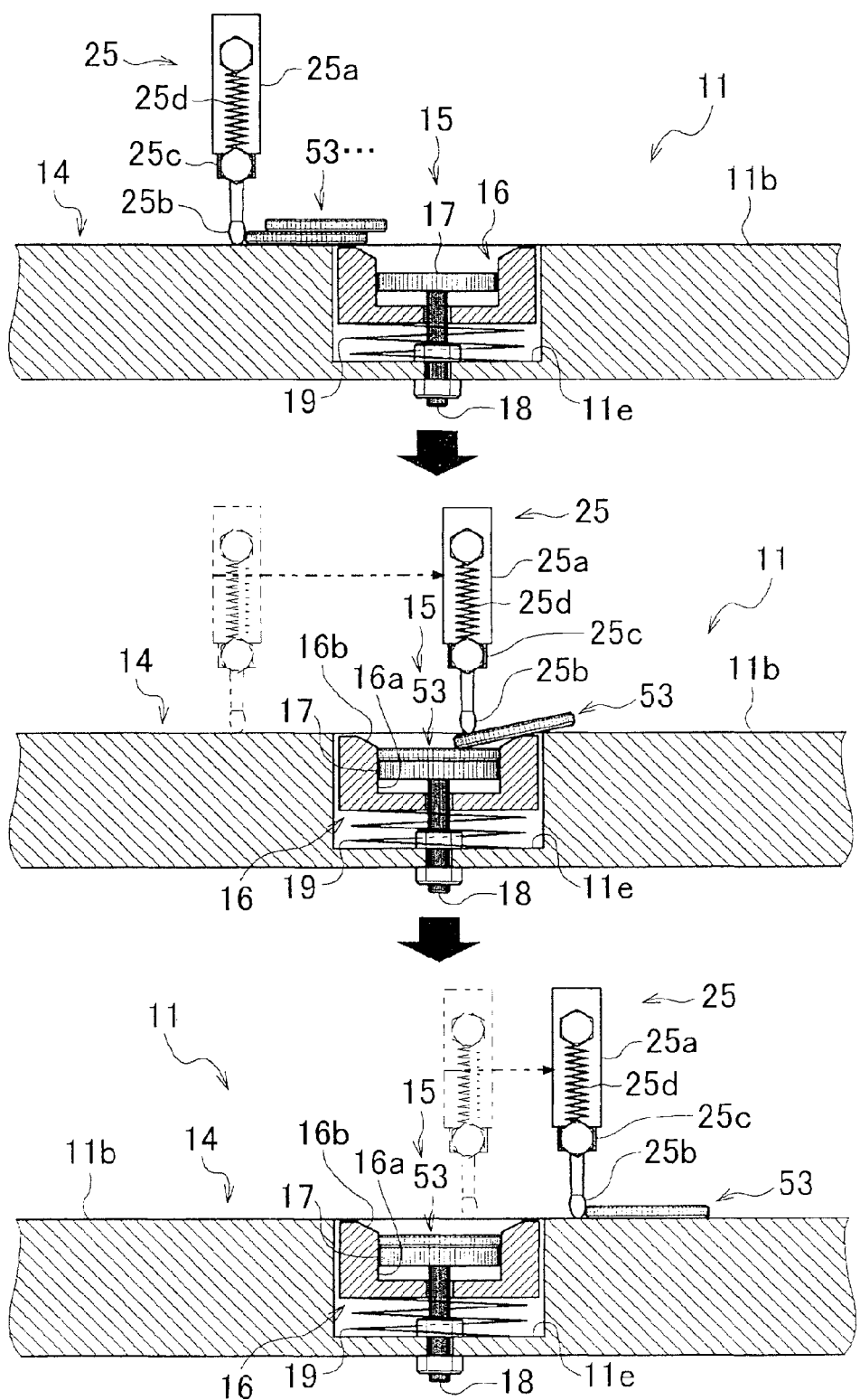
FIG. 12 is a view showing a frame format of washers being dispersed by the dispersing portion in a conveyance path provided in the washer arranging apparatus.

As shown in FIG. 12, the dispersing portion 25 rotates, in a state in which the abutting portion 25b is contacting the conveyance path 14, as the cylindrical portion 24 rotates, and pushes the washers 53 on the conveyance path 14 in the rotational direction. The dispersing portion 25 is able to cause a washer 53 to fall into a retaining portion 15, or push a washer 53 that is waiting at a retaining portion 15 already filled by a washer 53 toward another retaining portion 15, thereby dispersing the washers 53.

In the dispersing portion 25, the abutting portion 25b is returned to its original rotational position by the spring 25d, and is able to swivel about the axis of the hole 25e. Thus, even if there is a slight step or the like in the conveyance path 14, the abutting portion 25b is able to rotate while contacting the conveyance path 14 without getting caught, so the washer 53 on the conveyance path 14 is able to be reliably pushed.

Figure 13A:
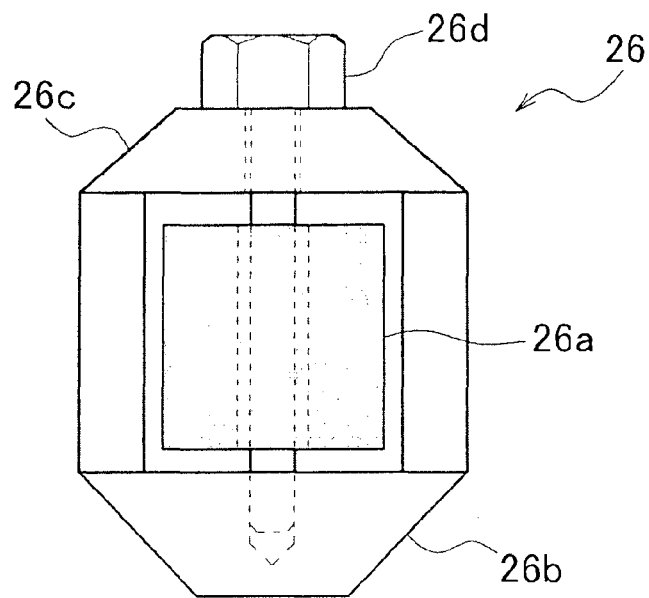
FIG. 13A is a front view showing a frame format of a pushing portion provided in the washer arranging apparatus.
Figure 13B:
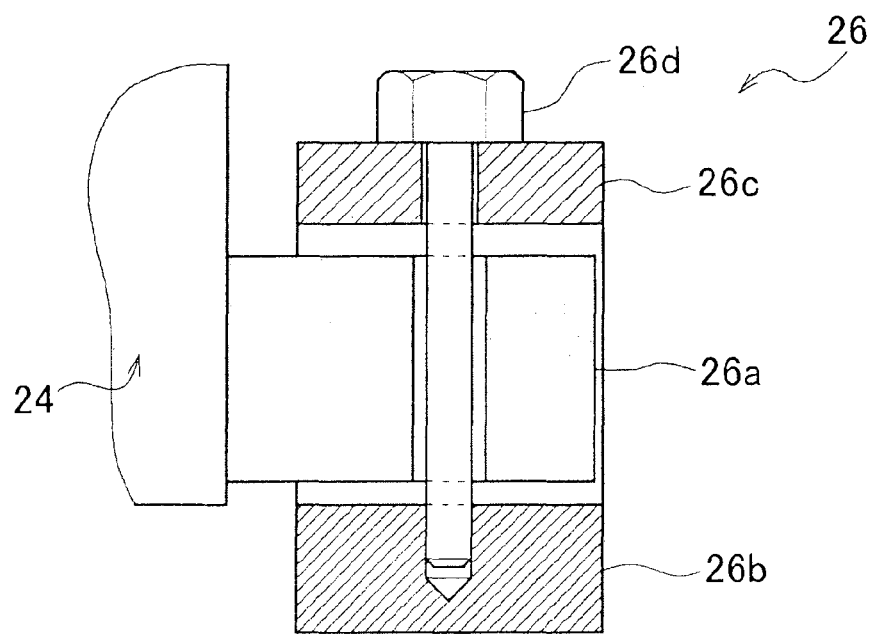
FIG. 13B is a side sectional view showing a frame format of the pushing portion provided in the washer arranging apparatus.

Also, as shown in FIGS. 13A and 13B, the pushing portions 26 are portions for pushing the washers 53 in a substantially vertically downward, in order to completely fit washers 53 that are not completely fit into the retaining portions 15 into retaining portions 15. Each pushing portion 26 includes a base portion 26a, an abutting portion 26b, and a spindle 26c and the like.

Figure 14:
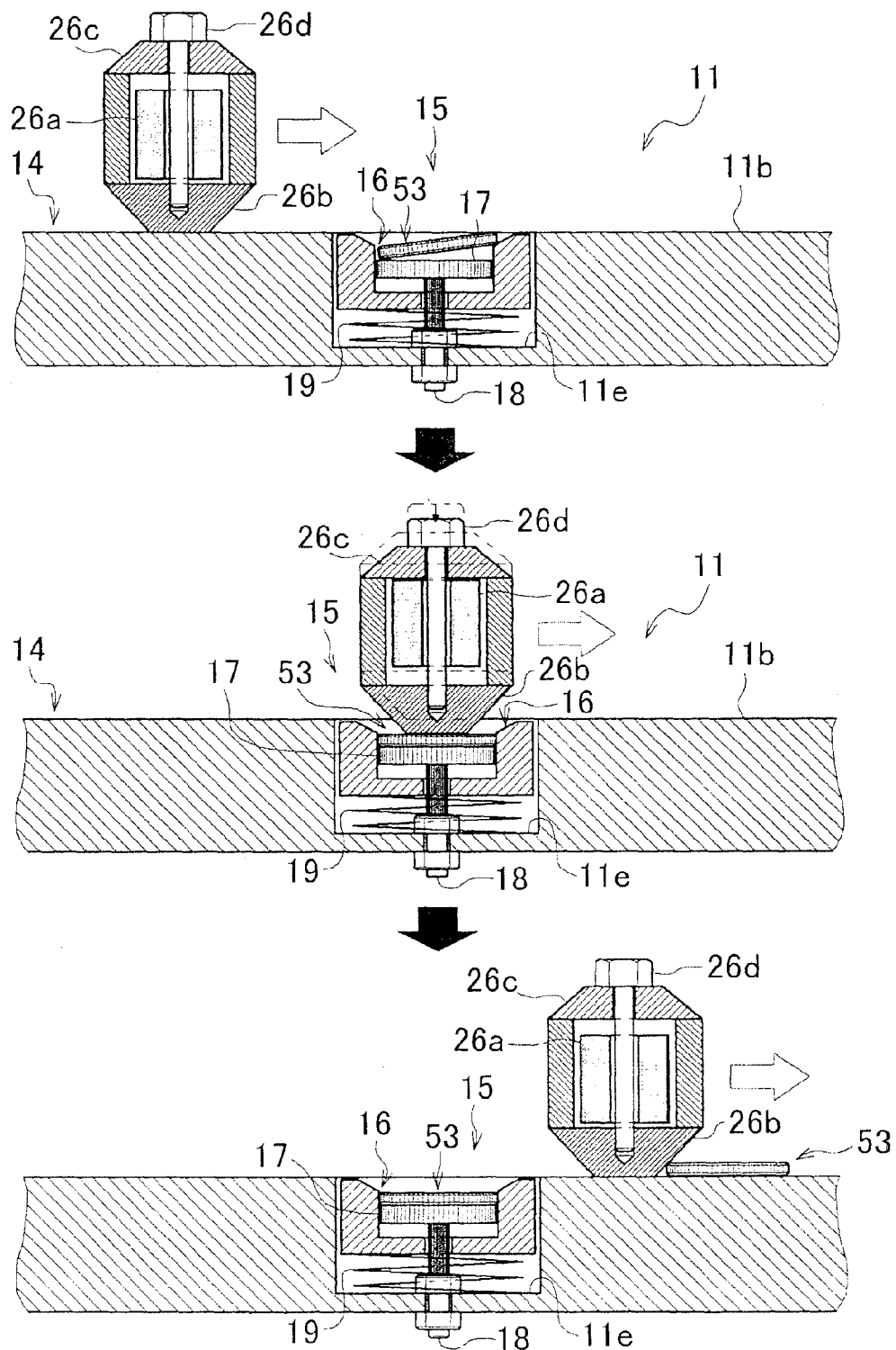
FIG. 14 is a view showing a frame format of a washer being pushed by the pushing portion into the retaining portion provided in the conveyance path.

As shown in FIG. 14, the base portion 26a of the pushing portion 26 is fixed to an outer peripheral surface of the cylindrical portion 24, and the abutting portion 26b and the spindle 26c are able to be vertically displaced along a shaft portion 26d. The abutting portion 26b rotates in a state contacting the conveyance path 14 as the cylindrical portion 24 rotates, and as it does so, it pushes washers 53 that are not fit into the retaining portions 15 downward. With the pushing portion 26, stress necessary to reliably push the washers 53 into the retaining portions 15 is ensured by gravity acting on the spindle 26c.

Further, the pushing portion 26 is also able to cause a washer 53 to fall into a retaining portion 15, or push a washer 53 that is waiting at a retaining portion 15 already filled by a washer 53 toward another retaining portion 15, thereby dispersing the washers 53.

That is, in the washer arranging apparatus 10 according to the example embodiment of the invention, the washer supplying portion. 12 includes i) the dispersing portions 25 that serve as a first pushing portion that is a portion that is provided protruding radially outward from the cylindrical portion 24 and contacts the washer arranging portion 11, and pushes the washers 53 supplied to the washer arranging portion 11 in the rotational direction of the rotary vane 23 in the conveyance path 14 on the washer arranging portion 11, and ii) the pushing portions 26 that serve as a second pushing portion that is a portion for pushing the washers 53 supplied to the washer arranging portion 11 downward in the retaining portions 15. This kind of structure makes it possible to reliably fit the washers 53 that are not completely in retaining portions 15 into the retaining portions 15.

Next, the driving portion 13 will be described. As shown in FIG. 4, the driving portion 13 is a portion for applying rotary force to the rotating shaft 27 in order to rotate the rotary vane 23 and the cylindrical portion 24 of the washer supplying portion 12. The driving portion 13 includes a motor 5 and the like. Also, a drive pulley 6 is formed on an end portion of a motor shaft 5a of the motor 5, and a rubber ring 8 is wound between the drive pulley 6 and a driven pulley 7 fixed onto the rotating shaft 27.

With this kind of structure, when the motor 5 is started and the motor shaft 5a (i.e., the drive pulley 6) is rotatably driven, rotary force is transmitted to the driven pulley 7 via the rubber ring 8, such that the rotating shaft 27 is able to be rotatably driven. With the washer arranging apparatus 10, the rotary vane 23 and the cylindrical portion 24 of the washer supplying portion 12 are rotatably driven by rotatably driving the rotating shaft 27 with the driving portion 13.

That is, the washer arranging apparatus 10 according to this example embodiment of the invention includes the washer arranging portion 11 that is substantially ring-shaped and is a portion for positioning a plurality of washers 53 in predetermined arranging positions α1 to α10, and the washer supplying portion 12 that is a portion for supplying the plurality of washers 53 to the washer arranging portion 11 and is arranged inside of the washer arranging portion 11. The washer supplying portion 12 includes i) the holding portion 20 that is a portion for holding the plurality of washers 53 loaded into the washer supplying portion 12 and that has a horizontal floor portion (i.e., the bottom surface portion 21a of the base portion 21), and ii) the rotary vane 23 that is a vane member that rotates above the bottom surface portion 21a around the axis of the washer arranging portion 11 and pushes the washers 53 held in the holding portion 20 in a direction parallel to the bottom surface portion 21a. With this kind of structure, the rotary vane 23 pushes the washers 53 on the bottom surface portion 21a horizontally and radially outward and discharges the washers from the holding portion 20, thus enabling the washers 53 to be easily supplied to the washer arranging portion 11.

Further, in the washer arranging apparatus 10 according to the example embodiment of the invention, the holding portion 20 is formed by i) the substantially truncated cone-shaped base portion 21 that has the bottom surface portion 21a that forms a substantially circular horizontal surface formed in a position higher than the washer arranging portion 11, and the inclined surface 21b that forms an inclined portion that is inclined downward toward the outside in the radial direction with respect to the horizontal direction, on the outer peripheral edge portion of the bottom surface portion 21a, and ii) the cylindrical portion 24 that is a substantially cylindrical portion arranged with its axial center aligned with the rotational axis of the rotary vane 23, and is integrally formed with the rotary vane 23. The washer discharge ports 24a that are open portions for discharging the washers 53 are formed in the end portion of the cylindrical portion 24 on the side of the cylindrical portion 24 opposite (i.e., facing) the bottom surface portion 21a. With this kind of structure, the washers 53 loaded in the holding portion 20 and held on the bottom surface portion 21a are pushed in a horizontal direction by the rotary vane 23 and discharged from the washer discharge ports 24a, and the washers 53 that have been discharged from the washer discharge ports 24a slide down along the inclined surface 21b. As a result, the washers 53 are able to be supplied to the washer arranging portion 11.

Figure 15A:
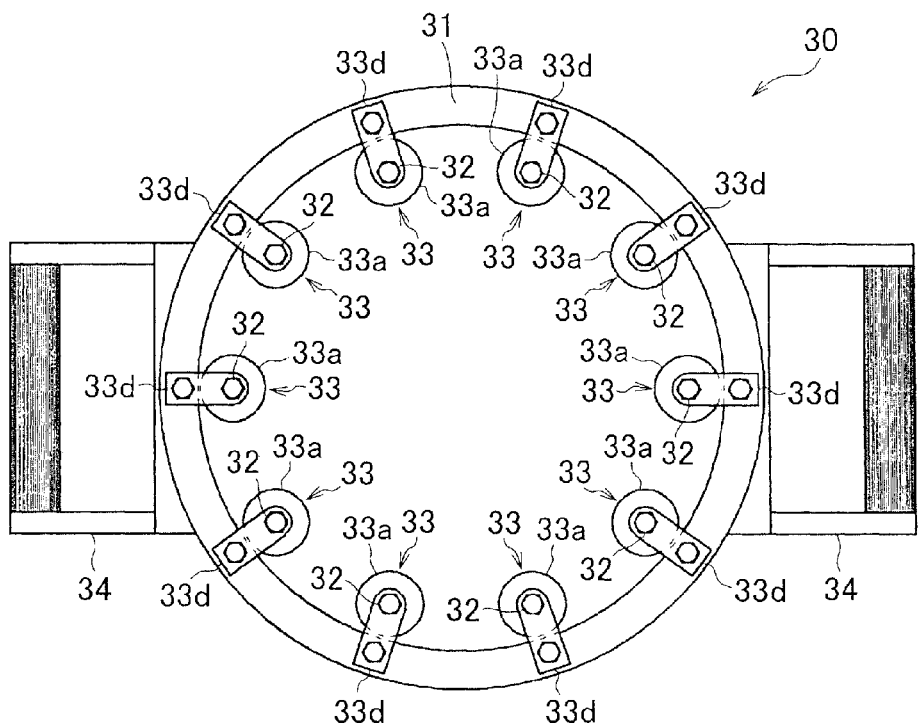
FIG. 15A is a plan view showing a frame format of a washer setting tool that forms part of the washer arranging system according to the example embodiment.
Figure 15B:
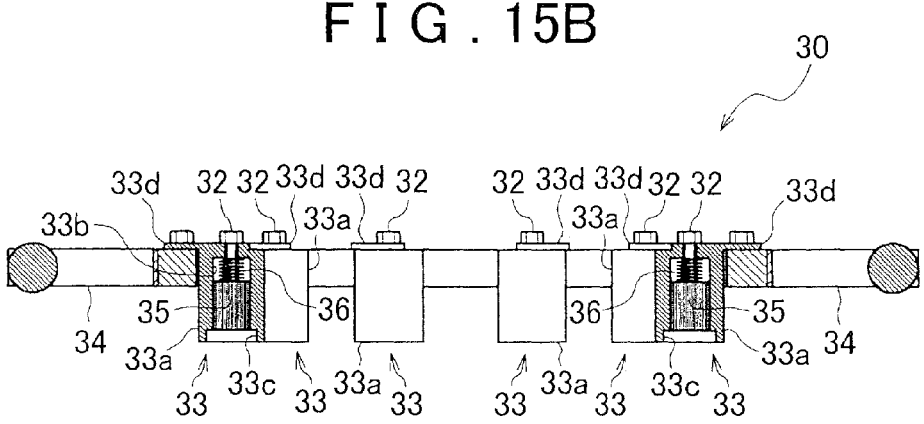
FIG. 15B is a side sectional view showing a frame format of the washer setting tool.

Next, the washer setting tool according to the example embodiment of the invention will be described with reference to FIGS. 15A and 15B to 19. The washer setting tool 30 that forms part of the washer arranging system 1 according to the example embodiment of the invention is a tool for simultaneously supplying a plurality of washers 53 to a plurality of stud bolts 51a that are screwable members provided on the rear axle assembly 51 (see FIGS. 1A and 1B). The washer setting tool 30 includes a main body portion 31, support shafts 32, socket portions 33, and handles 34 and the like, as shown in FIGS. 15A and 15B.

The main body portion 31 is a substantially ring-shaped portion for supporting the plurality of socket portions 33. Also, the support shafts 32 are substantially bolt-shaped shaft members that are supported in the socket portions 33 in a state so as to be displaceable in the axial direction. A magnet 35 is provided on the tip end portion of each support shaft 32.

Figure 16:
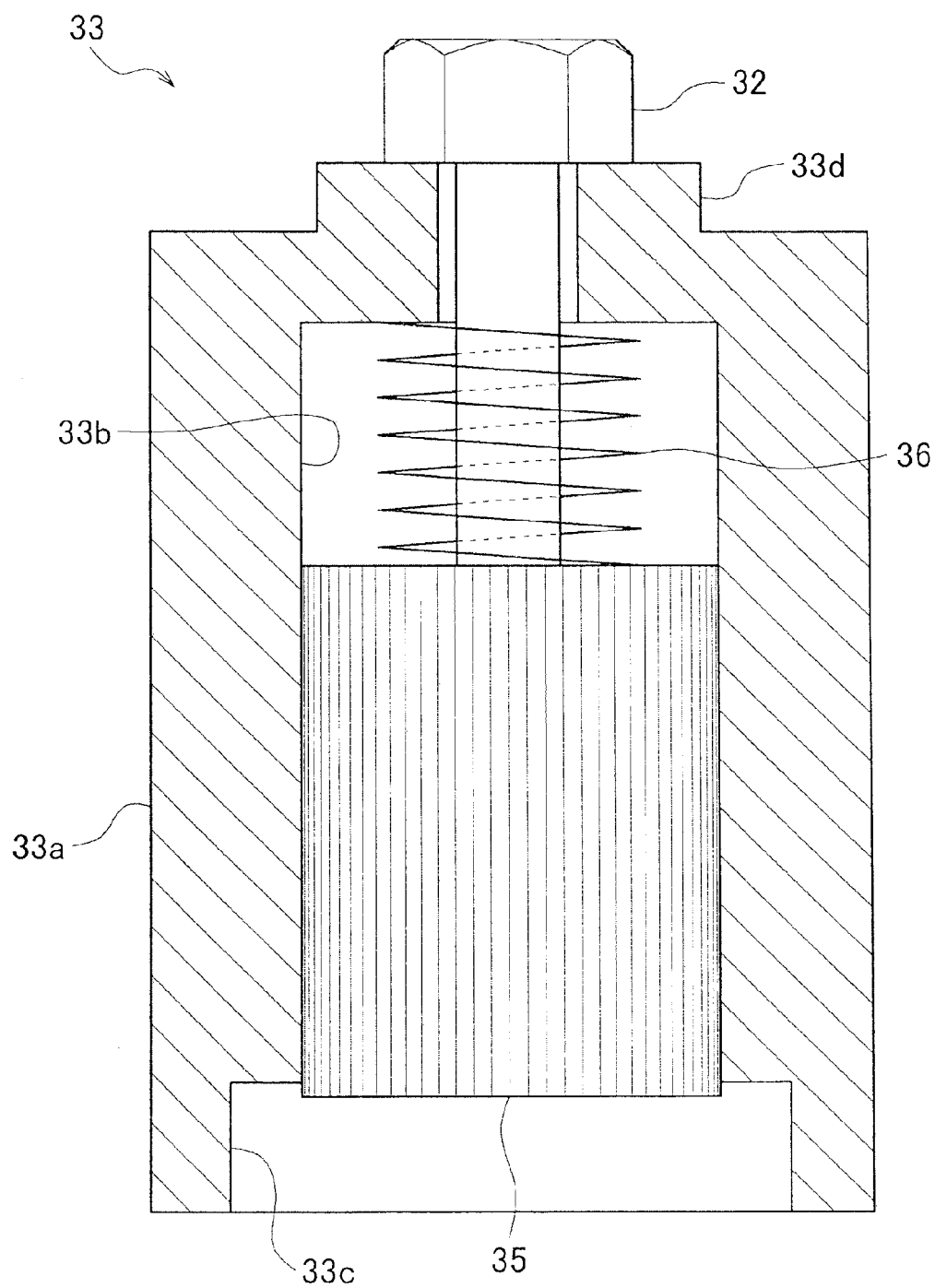
FIG. 16 is a side sectional view showing a frame format of a socket portion provided in the washer setting tool.

As shown in FIG. 16, each socket portion 33 includes a socket 33a that is a substantially cylindrical member. A recessed portion 33b that is a substantially cylindrical void portion is formed along the axis inside the socket 33a. Also, a retaining portion 33c that is a substantially cylindrical void portion with a diameter even larger than that of the recessed portion 33b and is a recessed portion for retaining the washer 53 is formed on an open side end portion of the recessed portion 33b. The inside diameter dimension of the retaining portion 33c substantially matches (but is slightly larger than) the outside diameter dimension of the washer 53. Moreover, a stay portion 33d that is a portion for fixing the socket 33a to the main body portion 31 is formed on the socket 33a.

Also, the substantially cylindrical magnet 35 is housed inside the recessed portion 33b. The magnet 35 has magnetic force. The washer 53 is held in the retaining portion 33c by the magnet 35 magnetically attracting the washer 53 arranged in the retaining portion 33c. The socket 33a has a dividable structure that is made from a plurality of members to improve the assimilability of the support shaft 32 and the magnet 35, and make it easy to replace parts when they become worn or the like.

The outside diameter dimension of the magnet 35 substantially matches (but is slightly smaller than) the inside diameter dimension of the recessed portion 33b. The magnet 35 is able to be displaced in the axial direction of the recessed portion 33b, inside the recessed portion 33b. Also, the magnet 35 is supported so as to be displaceable in the axial direction by the support shaft 32 as well, so the magnet 35 can be stably displaced in the axial direction of the support shaft 32, inside the recessed portion 33b.

Furthermore, a spring 36 that is an elastic member is interposed in a space formed by the recessed portion 33b and the magnet 35. When the magnet 35 is pushed upward, the magnet 35 is urged in a downwardly displaced direction by the spring 36, and when the magnet 35 stops being pushed upward, the magnet 35 returns to its original position by the elastic force of the spring 36. Normally (i.e., when the magnet 35 is not being pushed upward), the lower end surface of the magnet 35 is arranged protruding from the bottom surface of the retaining portion 33c, so a washer 53 fitted into the retaining portion 33c is able to be reliably attracted by the magnet 35.

Figure 17:
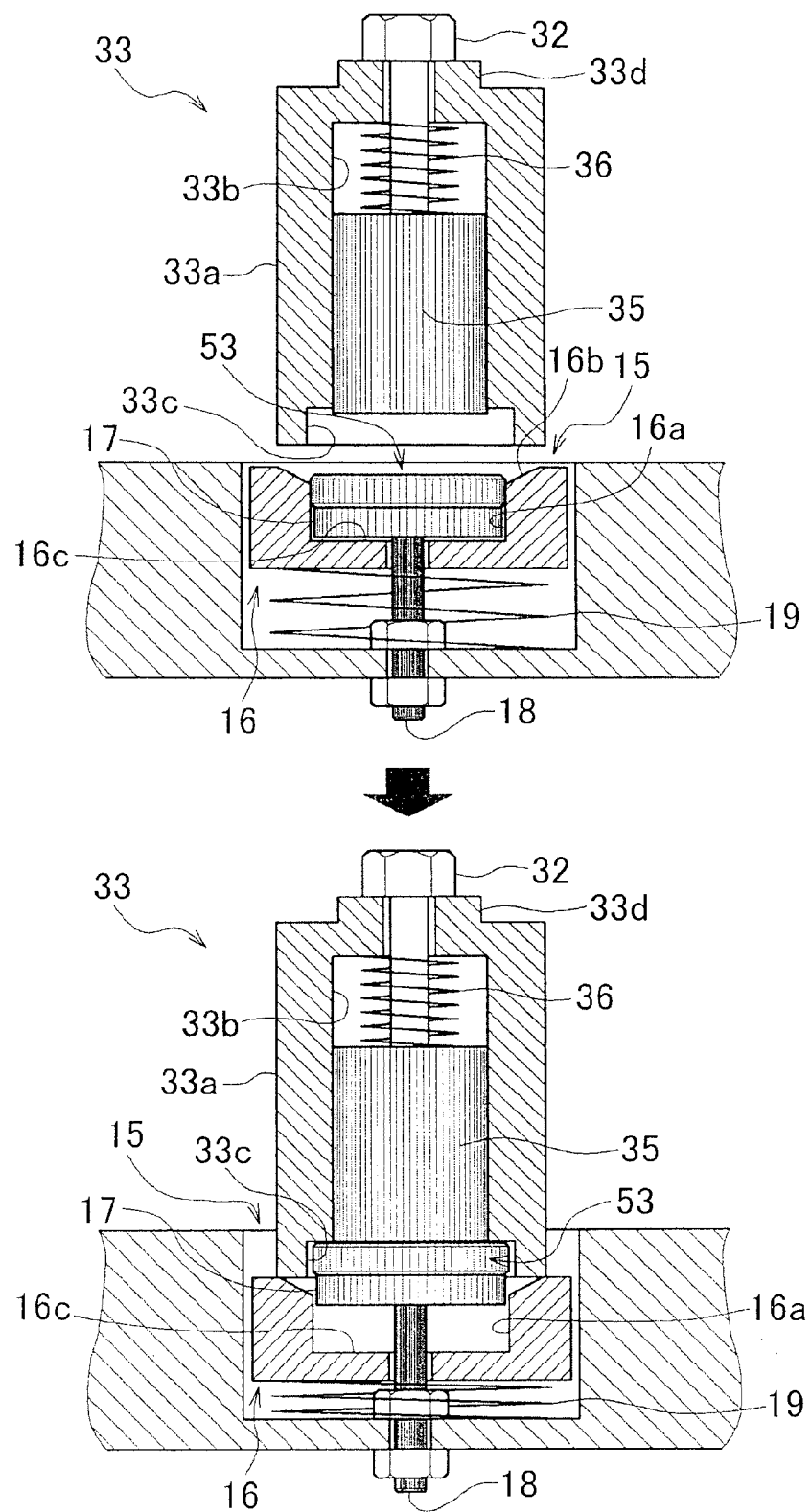
FIG. 17 is a view showing a frame format of a washer being delivered from the washer arranging apparatus to the washer setting tool (i.e., when a washer setting tool is provided and a washer is in the middle of being delivered)

As shown in FIG. 17, when the retaining portion 33c formed in the socket 33a is arranged directly above a retaining portion 15 that is retaining a washer 53, with the axis of the retaining portion 33c aligned with the axis of the retaining portion 15, and the socket portion 33 is lowered, the guide member 16 is pushed by the lower end portion of the socket 33a, such that the guide member 16 is able to be displaced downward. At this time, the washer 53 is no longer restrained by the guide member 16, so the washer 53 can be easily transferred.

Also, at the same time, the washer 53 is fitted in the retaining portion 33c and attracted by the magnet 35, so the washer 53 can be reliably held by the socket portion 33.

Figure 18:
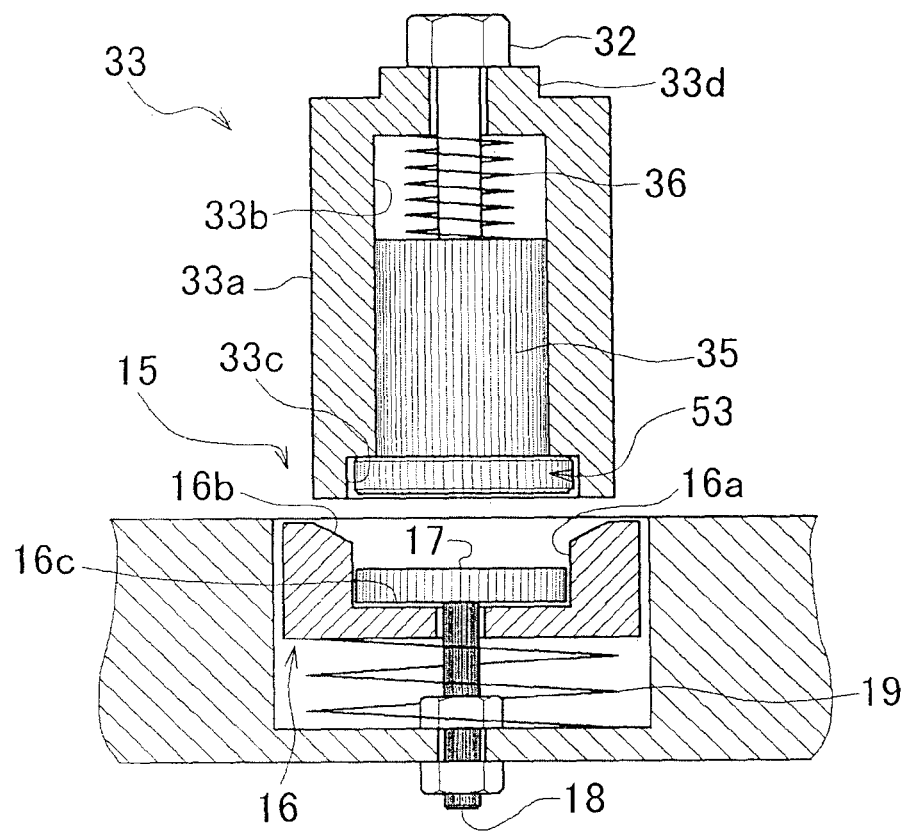
FIG. 18 is a view showing a frame format of a washer has been delivered from the washer arranging apparatus to the washer setting tool (i.e., after delivery is complete)

As shown in FIG. 18, loading of the washer 53 into the socket portion 33 is complete when the socket portion 33 is displaced upward after the washer 53 is loaded into the retaining portion 33c.

As shown in FIG. 15A, the plurality of socket portions 33 are provided in the washer setting tool 30, and by using the washer arranging apparatus 10, the washers 53 are able to be simultaneously loaded into the socket portions 33. That is, the washers 53 are able to be simultaneously loaded into the socket portions 33 by lowering the washer setting tool 30 from the state in which the socket portions 33 are arranged vertically above the retaining portions 15 of the washer arranging apparatus 10.

Figure 19:
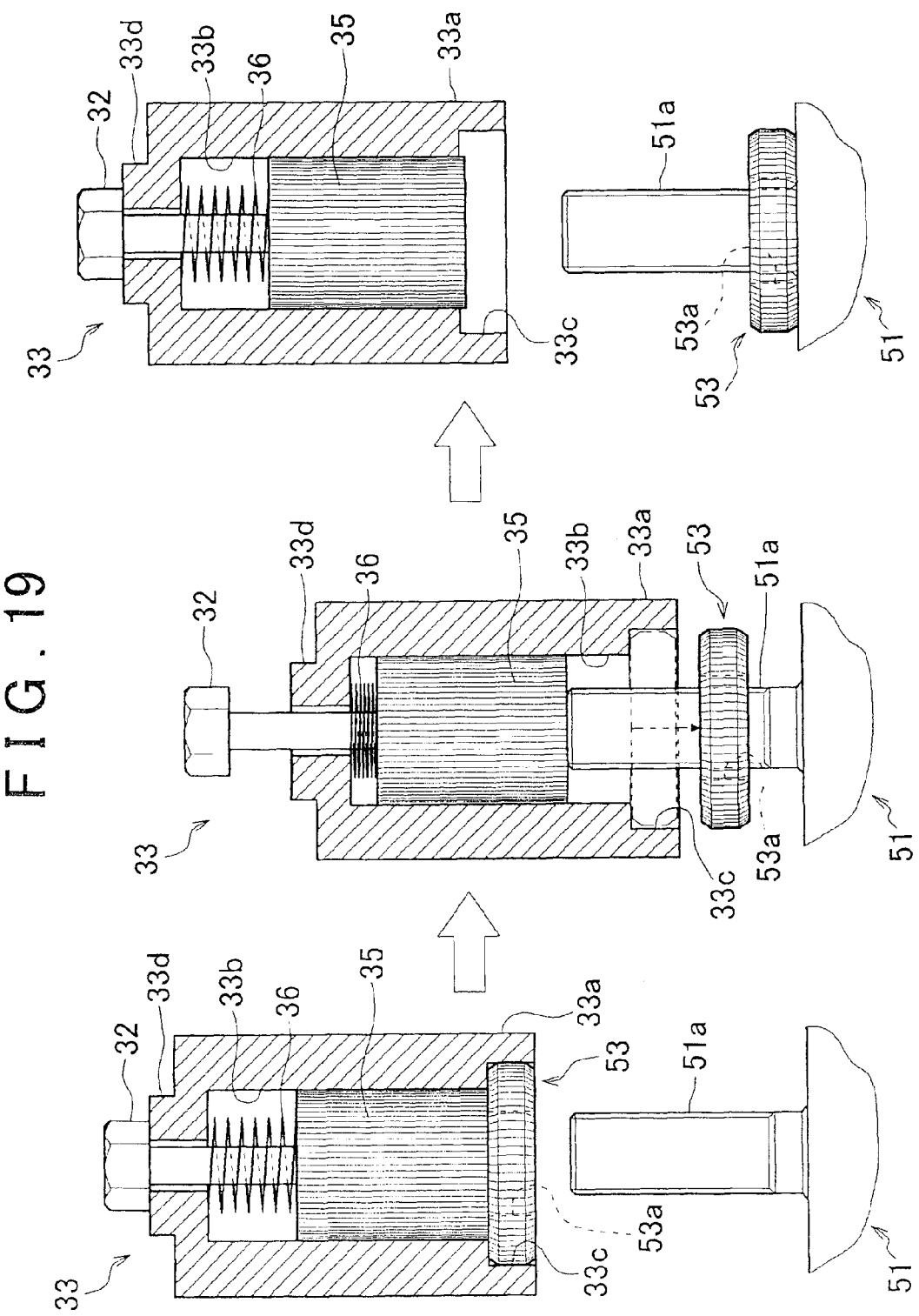
FIG. 19 is a view showing a frame format of a washer being arranged on a stud bolt by the washer setting tool.

As shown in FIG. 19, when the socket portion 33 in a state in which the washer 53 is held in the retaining portion 33c is arranged directly above the stud bolt 51a, with the axis of the socket portion 33 aligned with the axis of the stud bolt 51a, and the socket portion 33 is lowered, the stud bolt 51a is inserted through a hole 53a in the washer 53, and the magnet 35 is pushed upward by the stud bolt 51a.

Then, when the magnet 35 is displaced upward a predetermined distance, the magnetic force of the magnet 35 no longer affects the washer 53, so the washer 53 falls from the retaining portion 33c. When this happens, the stud bolt 51a is in a state inserted through the hole 53a in the washer 53, so the washer 53 falls along the stud bolt 51a and is arranged in a predetermined position.

As shown in FIG. 15A, the plurality of socket portions 33 are provided on the washer setting tool 30. The washers 53 are able to be simultaneously supplied to the plurality of stud bolts 51a by lowering the washer setting tool 30 while the axes of the socket portions 33 are pointed in the vertical direction.

Next, a method for arranging washers using the washer arranging system 1 according to the example embodiment of the invention will be described with reference to FIGS. 12, 14, 17, 19, and 20. Here, a case will be described in which washers 53 are supplied one at a time to the stud bolts 51a when a work 50 is arranged such that the stud bolts 51a provided on the rear axle assembly 51 are protruding vertically upward (see FIGS. 1A and 1B).

As shown in FIG. 20, when arranging a plurality of washers 53 using the washer arranging system 1, a first washer arranging step (STEP-1) is first performed. In the first washer arranging step (STEP-1), first 10 washers are gathered together and prepared, and the 10 washers 53 are loaded into the washer supplying portion 12 of the washer arranging apparatus 10 (STEP-1-1). Then the washer arranging apparatus 10 is powered up and started (STEP-1-2).

When the washer arranging apparatus 10 is started, the plurality of washers 53 that are pushed out by the rotary vane 23 and discharged from the holding portion 20 slide down the inclined surface 21b of the base portion 21 and are delivered to the conveyance path 14 formed on the washer arranging portion 11. As shown in FIG. 12, the plurality of washers 53 delivered to the conveyance path 14 are pushed in the circumferential direction by the dispersing portions 25, and fit one by one into the retaining portions 15 formed in the bottom surface of the conveyance path 14. Also, as shown in FIG. 14, washers 53 that are not completely fit into retaining portions 15 are pushed downward by the pushing portions 26 so that they fit completely into the retaining portions 15.

Also, as shown in FIG. 20, soon the washers 53 are arranged one by one in all of the retaining portions 15 (STEP-1-3). After the washers 53 are arranged in all of the retaining portions 15, the washer arranging apparatus 10 is stopped (STEP-1-4) and the first washer arranging step (STEP-1) ends.

Next, the process proceeds on to a washer loading step (STEP-2). The washers 53 arranged in the arranging positions α1 to α10 in the washer arranging apparatus 10 are loaded into the washer setting tool 30. In the loading operation at this time, the washer setting tool 30 is first arranged such that the socket portions 33 of the washer setting tool 30 are positioned directly above the retaining portions 15 of the washer arranging apparatus 10, as shown in FIGS. 17 and 20 (STEP-2-1). Then in this state, the washer setting tool 30 is lowered, and the socket portions 33 are brought close to the washers 53 that are retained in the retaining portions 15.

When the distance between the socket portions 33 and the washers 53 becomes equal to or less than a predetermined distance, the washers 53 are attracted by the magnets 35 housed in the socket portions 33, and the washers 53 are set in position within recessed portions (i.e., the retaining portions 33c) formed in the sockets 33a.

In this state, in the retaining portions 33c, the washers 53 are attracted by the magnets 35, so when the washer setting tool 30 is raised, all of the washers 53 retained by the retaining portions 33c will be retained in the socket portions 33 and will not fall out or the like. In this way, the plurality of washers 53 to be supplied to the stud bolts 51a are loaded into the washer setting tool 30 (STEP-2-2). With this, the washer loading step (STEP-2-2) ends.

Next, the process proceeds on to a second washer arranging step (STEP-3). As shown in FIGS. 19 and 20, in the second washer arranging step (STEP-3), the washers 53 are arranged onto the rear axle assembly 51 provided with a plurality of stud bolts 51a using the washer setting tool 30 that is loaded with the plurality of washers 53.

In the arranging operation at this time, first the washer setting tool 30 is arranged such that the socket portions 33 of the washer setting tool 30 are positioned directly above the stud bolts 51a of the rear axle assembly 51 (STEP-3-1). Then in this state, the washer setting tool 30 is lowered such that the stud bolts 51a fit inside the socket portions 33.

When this happens, the stud bolts 51a are inserted through the holes 53a of the washers 53, and the magnets 35 are pushed upward by the stud bolts 51a.

Here, the washers 53 are held in the retaining portions 33c and are not displaced upward, so the washers 53 separate from the magnets 35. Then as the separation distance between the washers 53 and the magnets 35 increases, the attraction force on the washers 53 by the magnets 35 decreases.

Before long, the attraction force of the magnets 35 becomes smaller than the gravitational force acting on the washers 53, and when this happens, the washers 53 fall. In this way, the washers 53 are supplied to the stud bolts 51a with the stud bolts 51a inserted through the holes 53a (STEP-3-2). Then the washers 53 finish being arranged on the stud bolts 51a of the rear axle assembly 51 by the washer setting tool 30 (STEP-3-3). With this, second washer arranging step (STEP-3) ends, and thus the series of washer arranging operations using the washer arranging system 1 ends.

That is, the plurality of washers 53 are able to be simultaneously supplied to the plurality of stud bolts 51a by the simply operation of pushing the washer setting tool 30 that is loaded with washers 53 onto the rear axle assembly 51 (or more specifically, onto the stud bolts 51a) using the washer setting tool 30. As a result, the work of arranging the washers 53 is able to be performed extremely efficiently.

That is, the washer arranging system 1 according to the example embodiment of the invention includes the washer arranging apparatus 10, and the washer setting tool 30 that is a tool for simultaneously setting a plurality of washers 53, that has a plurality of socket portions 33 arranged in positions corresponding to the predetermined arranging positions α1 to α10 set in the washer arranging portion 11, and in which retaining portions 33c that are recessed portions shaped such that the washers 53 will fit therein are formed in the socket portions 33. With this kind of structure, the washers 53 are able to be simultaneously and reliably arranged on the plurality of stud bolts 51a by the washer arranging system 1 that has a simple structure.

Also, the method for arranging the washers 53 according to the example embodiment of the invention uses the washer arranging system 1, and includes i) a step (STEP-1) of arranging the plurality of washers 53 in the predetermined arranging positions α1 to α10 on the washer arranging portion 11 by the washer supplying portion 12 of the washer arranging apparatus 10, ii) a step (STEP-2) of arranging the washer setting tool 30 with respect to the washer arranging apparatus 10, that is in a state in which the plurality of washers 53 are arranged in the predetermined arranging positions α1 to α10, such that the socket portions 33 are arranged vertically above the arranging positions α1 to α10, displacing the washer setting tool 30 vertically downward, and loading the washers 53 that are arranged in the arranging positions α1 to α10 on the washer arranging portion 11 into the retaining portions 33c of the washer setting tool 30, and iii) a step (STEP-3) of arranging the socket portions 33 of the washer setting tool 30 that is in a state in which the washers 53 are loaded into the retaining portions 33c, vertically above the plurality of stud bolts 51a onto which the washers 53 are to be arranged, displacing the washer setting tool 30 vertically downward, and arranging the washers 53 onto the stud bolts 51a. With this kind of structure, the washers 53 are able to be simultaneously and reliably arranged onto the plurality of stud bolts 51a by the washer arranging system 1 that has a simple structure.

The invention claimed is:

1. A washer arranging apparatus comprising:
a washer arranging portion that has a substantially ring-shaped shape and is a portion for positioning a plurality of washers in predetermined arranging positions; and
a washer supplying portion that is a portion for supplying the plurality of washers to the washer arranging portion and that is arranged inside the washer arranging portion,
wherein the washer supplying portion includes a holding portion that has a horizontal floor portion and is a portion for holding the plurality of washers loaded into the washer supplying portion, and a vane member that rotates above the floor portion about an axis of the washer arranging portion and pushes the washers held in the holding portion in a direction parallel to the floor portion,
the holding portion is formed by i) a substantially truncated cone-shaped base portion that has a bottom surface portion that forms a bottom portion and is a substantially circular horizontal surface formed in a position higher than the washer arranging portion, and an inclined surface that forms an inclined portion that is inclined downward toward an outside in a radial direction with respect to a horizontal direction, on an outer peripheral edge portion of the bottom surface portion, and ii) a cylindrical portion that is a substantially cylindrical portion arranged with an axial center thereof aligned with a rotational axis of the vane member, and is integrally formed with the vane member; and
a washer discharge port that is an open portion for discharging the washers is formed in an end portion of the cylindrical portion on a side of the cylindrical portion opposite the bottom surface portion.

2. The washer arranging apparatus according to claim 1, wherein
the washer arranging portion includes retaining portions that are recessed portions having a shape corresponding to the washers, into which the washers fit, that hold the washers horizontal, at predetermined positions for arranging the washers;
each of the retaining portions includes a support member that supports a lower surface of the washers, and a guide member that follows an outer peripheral surface of the washers; and
the guide member is configured to be able to be displaced in a vertical direction and able to be displaced lower than the support member.

3. The washer arranging apparatus according to claim 2, wherein the washer supplying portion includes:
a first pushing portion that is a portion that protrudes radially outward from the cylindrical portion and contacts the washer arranging portion, and pushes the washers supplied to the washer arranging portion in a rotational direction of the vane member on the washer arranging portion, and
a second pushing portion that is a portion that pushes the washers supplied to the washer arranging portion downward in the retaining portions.

4. The washer arranging apparatus according to claim 3, wherein
the vane member is such that an extension line of a surface that abuts against the washers when viewed from the vertical direction is offset from a rotational center of the vane member, and
a width of the vane member when viewed from the vertical direction becomes narrower from the rotational center of the vane member toward an outer end portion of the vane member.

5. The washer arranging apparatus according to claim 4, wherein an upper surface of the vane member is formed by an inclined surface that is inclined downward toward an outside in a radial direction.

6. A washer arranging system comprising:
The washer arranging apparatus according to claim 1; and
a washer setting tool that is a tool for simultaneously setting the plurality of washers, that has a plurality of socket portions arranged in positions corresponding to predetermined arranging positions set on the washer arranging portion, and in which retaining portions that are recessed portions shaped such that the washers will fit therein are formed in the socket portions.

7. A washer arranging method using the washer arranging system according to claim 6, comprising:
a first arranging step of arranging the plurality of washers in the predetermined arranging positions on the washer arranging portion, with the washer arranging apparatus;
a loading step of arranging the washer setting tool with respect to the washer arranging apparatus, that is in a state in which the plurality of washers are arranged in the predetermined arranging positions, such that the socket portions are arranged vertically above the arranging positions, displacing the washer setting tool vertically downward, and loading the washers that are arranged in the arranging positions on the washer arranging portion into retaining portions of the washer setting tool; and
a second arranging step of arranging the socket portions of the washer setting tool that is in a state in which the washers are loaded into the retaining portions, vertically above a plurality of stud bolts onto which the washers are to be arranged, and displacing the washer setting tool vertically downward, and arranging the washers onto the stud bolts.

* * * * *